US008452521B2

(12) United States Patent
Iwazaki et al.

(10) Patent No.: US 8,452,521 B2
(45) Date of Patent: May 28, 2013

(54) INTER-CYLINDER AIR-FUEL RATIO IMBALANCE DETERMINATION APPARATUS FOR AN INTERNAL COMBUSTION ENGINE

(75) Inventors: Yasushi Iwazaki, Ebina (JP); Hiroshi Miyamoto, Susono (JP); Hiroshi Sawada, Gotenba (JP); Keiichiro Aoki, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/509,372

(22) PCT Filed: Nov. 12, 2009

(86) PCT No.: PCT/JP2009/069594
§ 371 (c)(1), (2), (4) Date: May 11, 2012

(87) PCT Pub. No.: WO2011/058662
PCT Pub. Date: May 19, 2011

(65) Prior Publication Data
US 2012/0232773 A1 Sep. 13, 2012

(51) Int. Cl.
*B60T 7/12* (2006.01)

(52) U.S. Cl.
USPC ............................ 701/103; 701/104; 123/434

(58) Field of Classification Search
USPC .................. 701/103–105, 114, 115; 123/434, 123/674, 679, 690
See application file for complete search history.

(56) References Cited

U.S. PATENT DOCUMENTS

| | | | | |
|---|---|---|---|---|
| 5,003,955 | A * | 4/1991 | Haraguchi et al. | 123/675 |
| 6,978,203 | B2 | 12/2005 | Yasui et al. | |
| 7,152,594 | B2 | 12/2006 | Anilovich et al. | |
| 7,950,269 | B2 | 5/2011 | Maeda et al. | |
| 8,011,231 | B2 | 9/2011 | Maeda et al. | |
| 8,131,451 | B2 | 3/2012 | Aoki | |
| 2010/0191444 | A1 | 7/2010 | Aoki | |
| 2012/0185156 | A1 * | 7/2012 | Iwazaki et al. | 701/104 |

FOREIGN PATENT DOCUMENTS

| | | | |
|---|---|---|---|
| JP | 2003-328848 | A | 11/2003 |
| JP | 2009-013967 | A | 1/2009 |
| JP | 2009-024531 | A | 2/2009 |
| JP | 2009-128273 | A | 6/2009 |
| JP | 2009-209747 | A | 9/2009 |
| JP | 2009-257245 | A | 11/2009 |

* cited by examiner

*Primary Examiner* — John Kwon
(74) *Attorney, Agent, or Firm* — Gifford, Krass, Sprinkle, Anderson & Citkowski, P.C.

(57) ABSTRACT

An inter-cylinder air-fuel imbalance determination apparatus according to the present invention obtains, based on the output value of the air-fuel ratio sensor, an air-fuel ratio fluctuation indicating amount whose absolute value becomes larger as a fluctuation of the air-fuel ratio of the exhaust gas passing through the air-fuel ratio sensor becomes larger, and further obtains an imbalance determination parameter which becomes larger as an absolute value of the air-fuel ratio fluctuation indicating amount becomes larger. In addition, the determination apparatus obtains an average value of the air-fuel ratio of the exhaust gas when the imbalance determination parameter is being obtained, and obtains an imbalance determination threshold which becomes smaller as the average value of the air-fuel ratio is closer to the stoichiometric air-fuel ratio. The determination apparatus determines that an inter-cylinder air-fuel ratio imbalance state has been occurring when the imbalance determination parameter is larger than the imbalance determination threshold.

18 Claims, 15 Drawing Sheets

INTER-CYLINDER AIR-FUEL RATIO IMBALANCE DETERMINATION APPARATUS FOR AN INTERNAL COMBUSTION ENGINE

TECHNICAL FIELD

The present invention relates to an "inter-cylinder air-fuel ratio imbalance determination apparatus for an internal combustion engine", which is applied to a multi-cylinder internal combustion engine, and which can determine (monitor/detect) that a degree of imbalance among air-fuel ratios of air-fuel mixtures, each supplied to each of cylinders (inter-cylinder air-fuel ratio imbalance; inter-cylinder air-fuel ratio variation; or inter-cylinder air-fuel ratio non-uniformity) has excessively increased.

BACKGROUND ART

As shown in FIG. 1, an air-fuel ratio control apparatus has been widely known, wherein the apparatus includes a three-way catalyst (53) disposed in an exhaust passage of an internal combustion engine, an upstream air-fuel ratio sensor (67) and a downstream air-fuel ratio sensor (68) disposed upstream and downstream of the three-way catalyst (53), respectively.

This air-fuel ratio control apparatus calculates an air-fuel ratio feedback amount based on outputs of the upstream and downstream air-fuel ratio sensors such that the air-fuel ratio of the air-fuel mixture supplied to the engine (air-fuel ratio of the engine) coincides with the stoichiometric air-fuel ratio, and feedback-controls the air-fuel ratio of the engine based on the air-fuel ratio feedback amount. Furthermore, there has been also widely known an air-fuel ratio control apparatus which calculates an "air-fuel ratio feedback amount to have the air-fuel ratio of the engine coincide with the stoichiometric air-fuel ratio" based on the output of the upstream air-fuel ratio sensor only, and feedback-controls the air-fuel ratio of the engine based on the air-fuel ratio feedback amount. The air-fuel ratio feedback amount used in each of those air-fuel ratio control apparatuses is a control amount commonly used for all of the cylinders.

Incidentally, in general, an electronic-fuel-injection-type internal combustion engine has at least one fuel injection valve (39) at each of the cylinders or at each of intake ports communicating with the respective cylinders. Accordingly, when the characteristic/property of the fuel injection valve of a certain specific cylinder changes to a "characteristic that the injection valve injects fuel in an amount excessively larger than an instructed fuel injection amount", only the air-fuel ratio of an air-fuel mixture supplied to that certain specific cylinder (the air-fuel ratio of the specific cylinder) greatly changes toward a rich side. That is, the degree of air-fuel ratio non-uniformity among the cylinders (inter-cylinder air-fuel ratio variation; inter-cylinder air-fuel ratio imbalance) increases. In other words, there arises an imbalance among "cylinder-by-cylinder air-fuel ratios", each of which is the air-fuel ratio of the air-fuel mixture supplied to each of the cylinders.

In such a case, the average of the air-fuel ratios of the air-fuel mixtures supplied to the entire engine becomes an air-fuel ratio in the rich side in relation to (with respect to) the stoichiometric air-fuel ratio. Accordingly, by the air-fuel ratio feedback amount commonly used for all of the cylinders, the air-fuel ratio of the above-mentioned certain specific cylinder is changed toward a lean side so as to come close to the stoichiometric air-fuel ratio, and, at the same time, the air-fuel ratios of the remaining cylinders are changed toward a lean side so as to deviate from the stoichiometric air-fuel ratio. As a result, the average of the air-fuel ratios of the air-fuel mixtures supplied to the entire engine is made substantially equal to the stoichiometric air-fuel ratio.

However, since the air-fuel ratio of the specific cylinder is still in the rich side with respect to the stoichiometric air-fuel ratio and the air-fuel ratios of the remaining cylinders are in the lean side with respect to the stoichiometric air-fuel ratio, combustion of the air-fuel mixture in each of the cylinders fails to become complete combustion. As a result, an amount of emissions (an amount of unburned combustibles and an amount of nitrogen oxides) discharged from each of the cylinders increases. Therefore, even when the average of the air-fuel ratios of the air-fuel mixtures supplied to the the engine is equal to the stoichiometric air-fuel ratio, the increased emissions cannot be completely removed/purified by the three-way catalyst. Consequently, the amount of emissions may increase.

Accordingly, in order to prevent emissions from increasing, it is important to detect a state in which the degree of air-fuel ratio non-uniformity among the cylinders has been excessively large (occurrence of an inter-cylinder air-fuel ratio imbalance state) to take some measures against the imbalance state. It should be noted that, an inter-cylinder air-fuel ratio imbalance also occurs, for example, in a case where the characteristic of the fuel injection valve of the certain specific cylinder changes to a characteristic that it injects fuel in an amount excessively smaller than the instructed fuel injection amount.

One of conventional apparatuses for determining whether or not such an inter-cylinder air-fuel ratio imbalance state has occurred is configured so as to obtain a trace/trajectory length of an output value (output signal) of an air-fuel ratio sensor (the above-mentioned upstream air-fuel ratio sensor 67) disposed at an exhaust merging/aggregated portion/region into which exhaust gases from a plurality of the cylinders of the engine merge, compare the trace length with a "reference value which changes in accordance with the rotational speed of the engine," and determine whether or not the inter-cylinder air-fuel ratio imbalance state has occurred on the basis of the result of the comparison (see, for example, U.S. Pat. No. 7,152,594).

It should be noted that, in the present specification, the expression "inter-cylinder air-fuel ratio imbalance state (excessive inter-cylinder air-fuel ratio imbalance state)" means a state in which the difference between the cylinder-by-cylinder air-fuel ratios (cylinder-by-cylinder air-fuel ratio difference) is equal to or greater than an allowable value; in other words, it means an inter-cylinder aft-fuel ratio imbalance state in which the amount of unburned combustibles and/or nitrogen oxides exceeds a prescribed value. The determination as to whether or not an "inter-cylinder air-fuel ratio imbalance state" has occurred will be simply referred to as "inter-cylinder air-fuel ratio imbalance determination" or "imbalance determination." Moreover, a cylinder supplied with an air-fuel mixture whose air-fuel ratio deviates from the air-fuel ratio of air-fuel mixtures supplied to the remaining cylinders (for example, an air-fuel ratio approximately equal to the stoichiometric air-fuel ratio) will also be referred to as an "imbalanced cylinder." The air-fuel ratio of the mixture supplied to the imbalanced cylinder will also be referred to as an "air-fuel ratio of the imbalanced cylinder." The remaining cylinders (cylinders other than the imbalanced cylinder) will also be referred to as "normal cylinders" or "balanced cylinders." The air-fuel ratio of the mixture supplied to the normal cylinder will also be referred as an "air-fuel ratio of the normal cylinder" or an "air-fuel ratio of the balanced cylinder,"

In addition, a value (e.g., the above-mentioned trace length of the output value of the air-fuel ratio sensor), whose absolute value becomes larger (monotonously) as the cylinder-by-cylinder air-fuel ratio difference (the difference between the air-fuel ratio of the imbalanced cylinder and those of the normal cylinders) becomes larger, and which is obtained based on the output value of the air-fuel ratio sensor in such a manner that the absolute value becomes larger as a fluctuation of an air-fuel ratio of an exhaust gas reaching the air-fuel ratio sensor becomes larger, will also be referred to as an "air-fuel ratio fluctuation indicating amount." In addition, a value, which becomes larger as an absolute value of the air-fuel ratio fluctuation indicating amount becomes larger, and which is obtained based on the air-fuel ratio fluctuation indicating amount will also be referred to as an "imbalance determination parameter." This imbalance determination parameter is compared with an imbalance determination threshold to carry out the Imbalance determination.

SUMMARY OF THE INVENTION

Meanwhile, as shown in (A) of FIG. 2, for example, a well known air-fuel ratio sensor comprises an air-fuel ratio detection section which includes at least "a solid electrolyte layer (671), an exhaust-gas-side electrode layer (672), an atmosphere-side electrode layer (673), and a diffusion resistance layer (674)." The exhaust-gas-side electrode layer (872) is formed on one of surfaces of the solid electrolyte layer (671). The exhaust-gas-side electrode layer (872) is covered with the diffusion resistance layer (674). Exhaust gas within an exhaust passage reaches an outer surface of the diffusion resistance layer (674), and reaches the exhaust-gas-side electrode layer (672) after passing through the diffusion resistance layer (674). The atmosphere-side electrode layer (673) is formed on the other one of surfaces of the solid electrolyte layer (671). The atmosphere-side electrode layer (673) is exposed in an atmosphere chamber (678) into which air is introduced.

As shown in (B) and (C) of FIG. 2, a voltage (Vp) for generating a "limiting current which changes in accordance with the air-fuel ratio of the exhaust gas" is applied between the exhaust-gas-side electrode layer (672) and the atmosphere-side electrode layer (673). In general, this voltage is applied such that the potential of the atmosphere-side electrode layer (873) is higher than that of the exhaust-gas-side electrode layer (672).

As shown in (B) of FIG. 2, when an excessive amount of oxygen is contained in the exhaust gas reaching the exhaust-gas-side electrode layer (672) after passing through the diffusion resistance layer (874) (that is, when the air-fuel ratio of the exhaust gas reaching the exhaust-gas-side electrode layer is leaner than the stoichiometric air-fuel ratio), the oxygen is led in the form of oxygen ions from the exhaust-gas-side electrode layer (672) to the atmosphere-side electrode layer (673) owing to the above-mentioned voltage and an oxygen pump characteristic of the solid electrolyte layer (871).

In contrast, as shown in (C) of FIG. 2, when excessive unburned combustibles are contained in the exhaust gas reaching the exhaust-gas-side electrode layer (672) after passing through the diffusion resistance layer (674) (that is, the air-fuel ratio of the exhaust gas reaching the exhaust-gas-side electrode layer is richer than the stoichlometric air-fuel ratio), oxygen within the atmosphere chamber (678) is led in the form of oxygen ions from the atmosphere-side electrode layer (673) to the exhaust-gas-side electrode layer (672) owing to the oxygen cell characteristic of the solid electrolyte layer (671) so as to react with the unburned combustibles at the exhaust-gas-side electrode layer (672).

Because of the presence of the diffusion resistance layer (674), a moving amount of such oxygen ions is limited to a value corresponding to the air-fuel ratio of the exhaust gas reaching the outer surface of the diffusion resistance layer (674). In other words, a current generated owing to the movement of the oxygen ions has a magnitude corresponding to the air-fuel ratio of the exhaust gas (that is, limiting current Ip) (see FIG. 3).

The air-fuel ratio sensor outputs an output value Vabyfs corresponding to an air-fuel ratio of the exhaust gas passing through a portion where the air-fuel ratio sensor is disposed, based on the limiting current (current flowing through the solid electrolyte layer caused by the application of the voltage between the exhaust-gas-side electrode layer and the atmosphere-side electrode layer). The output value Vabyfs is generally converted into a detected air-fuel ratio abyfs based on a "relation between the output value Vabyfs and the air-fuel ratio, shown in FIG. 4" that is obtained in advance. As is understood from FIG. 4, the output value Vabyfs is substantially proportional to the detected air-fuel ratio abyfs.

Meanwhile, the air-fuel ratio fluctuation indicating amount serving as "basic data for the imbalance determination parameter" is not limited to the trace length of "the output value Vabyfs of the air-fuel ratio sensor or the detected air-fuel ratio abyfs", but can be a value which reflects (varies according to) a fluctuation state (e.g., an amplitude of the fluctuation for a predetermined period) of the air-fuel ratio of the exhaust gas passing/flowing through the portion/region where the air-fuel ratio is disposed. This point will be described in more detail below.

Exhaust gases from the cylinders successively reach the air-fuel ratio sensor in the order of ignition (accordingly, in the order of exhaust). In a case where no inter-cylinder air-fuel ratio imbalance state has been occurring, the air-fuel ratios of the exhaust gases discharged from the cylinders are approximately equal to one another. Accordingly, as indicated by a broken line C1 shown in (B) of FIG. 5, in the case where no inter-cylinder air-fuel ratio imbalance state has been occurring, a waveform of the output value Vabyfs of the air-fuel ratio sensor (in (B) of FIG. 5, a waveform of the detected air-fuel ratio abyfs) is generally flat.

In contrast, in a case where there has been occurring an inter-cylinder air-fuel ratio imbalance state in which only the air-fuel ratio of a specific cylinder (for example, the first cylinder) has deviated toward the rich side from the stoichiometric air-fuel ratio (specific-cylinder rich-side-deviated imbalance state), the air-fuel ratio of the exhaust gas from the specific cylinder greatly differs from those of exhaust gases from the cylinders other than the specific cylinder (the remaining cylinders).

Accordingly, as indicated by a solid line C2 shown in (B) of FIG. 5, a waveform of the output value Vabyfs of the air-fuel ratio sensor (in (B) of FIG. 5, a waveform of the detected air-fuel ratio abyfs) greatly fluctuates in the case where the specific-cylinder rich-side-deviated imbalance state has been occurring. Specifically, in a case of a four-cylinder, four-cycle engine, the waveform of the output value Vabyfs of the air-fuel ratio sensor greatly fluctuates every elapse of 720° crank angle (a crank angle required for all of the cylinders, each of which discharges exhaust gas reaching the single air-fuel ratio sensor, to complete their single-time combustion strokes). It should be noted that, in the present specification, a "period corresponding to the crank angle required for all of the cylinders, each of which discharges exhaust gas reaching a single air-fuel ratio sensor, to complete their single-time combustion strokes" will also be referred to as a "unit combustion cycle period."

Further, as the degree of separation of the air-fuel ratio of the imbalanced cylinder from the air-fuel ratio of the balanced cylinders becomes greater, the amplitude of the output value Vabyfs of the air-fuel ratio sensor and the detected air-fuel ratio abyfs become greater, and these values greatly fluctuate. For example, if the detected air-fuel ratio abyfs changes as indicated by the solid line C2 in (B) of FIG. 5 when a magnitude of the air-fuel ratio difference between the imbalance cylinder and the balanced cylinders is a first value, the detected air-fuel ratio abyfs changes as indicated by an alternate long and short dash line C2*a* in (B) of FIG. 5 when the magnitude of the air-fuel ratio difference between the imbalance cylinder and the balanced cylinders is a "second value which is greater than the first value."

Accordingly, a change amount of "the output value Vabyfs of the air-fuel ratio sensor or the detected air-fuel ratio abyfs" per unit time (i.e., a first order differential value of "the output value Vabyfs of the air-fuel ratio sensor or the detected air-fuel ratio abyfs" with respect to time, or angles $\alpha 1$, $\alpha 2$ in (B) of FIG. 5) fluctuates slightly when the cylinder-by-cylinder air-fuel ratio difference is small as indicated by a broken line C3 shown in (C) of FIG. 5, and fluctuates greatly when the cylinder-by-cylinder air-fuel ratio difference is large as indicated by a solid line C4 shown in (C) of FIG. 5. That is, the differential value d(Vabyfs)/dt and the differential value d(abyfs)/dt are values whose absolute values become greater, as the degree of the inter-cylinder air-fuel ratio imbalance state becomes greater (i.e., as the cylinder-by-cylinder air-fuel ratio difference becomes greater).

Accordingly, for example, a maximum value or an average value of the absolute values of "the differential values d(Vabyfs)dt and the differential values d(abyfs)/dt", obtained multiple times during the unit combustion cycle period, can be adopted as the air-fuel ratio fluctuation indicating amount.

Furthermore, as shown in (D) of FIG. 5, a change amount of the change amount of "the output value Vabyfs of the air-fuel ratio sensor or the detected air-fuel ratio abyfs" per unit time hardly fluctuates when the cylinder-by-cylinder air-fuel ratio difference is small as indicated by a broken line C5, but fluctuates more greatly as the cylinder-by-cylinder air-fuel ratio difference is larger as indicated by a solid line C4.

Accordingly, for example, "a maximum value or an average value" of absolute values of "the second order differential value $d^2$(Vabyfs)/$dt^2$ or the second order differential value $d^2$(abyfs)/$dt^2$)", the values being obtained multiple times during the unit combustion cycle period, can be adopted as the air-fuel ratio fluctuation indicating amount.

Further, the inter-cylinder air-fuel ratio imbalance determination apparatus adopts, as an imbalance determination parameter, the above-mentioned air-fuel ratio fluctuation indicating amount or the like, and determines whether or not an inter-cylinder air-fuel ratio imbalance state has been occurring by determining whether or not the imbalance determination parameter is larger than a predetermined threshold value (imbalance determination threshold).

However, the present inventors have found that, when the air-fuel ratio of the exhaust gas fluctuates in an air-fuel ratio region/range which is very close to the stoichiometric air-fuel ratio (i.e., an air-fuel ratio region which has a range including/covering the stoichiometric air-fuel ratio, and which is also referred to as a "stoichiometric air-fuel ratio region"), a state occurs in which the output value Vabyfs of the air-fuel ratio sensor does not vary in response to the fluctuation in the air-fuel ratio of the exhaust gas with high responsivity, and therefore, the imbalance determination parameter obtained based on the air-fuel ratio fluctuation indicating amount can not indicate the "degree of the inter-cylinder air-fuel ratio imbalance state (cylinder-by-cylinder air-fuel ratio difference, that is, the difference in the air-fuel ratio between the imbalanced cylinder and the balanced cylinder)" with an adequate precision, and accordingly, a case arises in which the inter-cylinder air-fuel ratio imbalance determination can not be performed with high accuracy.

FIG. 6 is a graph to explain the above described phenomenon. The axis of ordinate of FIG. 6 corresponds to the imbalance determination parameter obtained based on the differential value d(abyfs)/dt. The axis of abscissas of FIG. 6 corresponds to an average value of air-fuel ratios of the exhaust gas passing through the portion at which the air-fuel sensor is disposed for a period in which the imbalance determination parameter is obtained (the average value being an average value of the air-fuel ratios of the exhaust gas reaching the air-fuel ratio sensor, and being also referred to as a "parameter obtaining period average air-fuel ratio"). A curve line C1 represents the imbalance determination parameter, when the cylinder-by-cylinder air-fuel ratio difference is relatively small. A curve line C2 represents the imbalance determination parameter when the cylinder-by-cylinder air-fuel ratio difference is moderate, however, it is not necessary to determine that the inter-cylinder air-fuel ratio imbalance state is occurring. A curve line C3 represents the imbalance determination parameter, when the cylinder-by-cylinder air-fuel ratio difference is relatively large, and it is therefore necessary to determine that the inter-cylinder air-fuel ratio imbalance state is occurring.

As is clear from FIG. 6, the imbalance determination parameter obtained when the parameter obtaining period average air-fuel ratio is within the "region/range close to the stoichiometric air-fuel ratio (stoichiometric air-fuel ratio region)" where, for example, the air-fuel ratio is roughly between 14.2 and 15.0, is smaller than any one of the imbalance determination parameter obtained when the parameter obtaining period average air-fuel ratio is within a rich region where the air-fuel ratio is smaller than or equal to 14.2 and the imbalance determination parameter obtained when the parameter obtaining period average air-fuel ratio is within a lean region where the air-fuel ratio is larger than or equal to 15.0.

Accordingly, as in the conventional apparatus, if the imbalance determination threshold is set to (at) a constant value (refer to an alternate long and two short dashes line L1 of FIG. 6), it may be determined that the inter-cylinder air-fuel ratio imbalance state is not occurring when the it should be determined that the inter-cylinder air-fuel ratio imbalance state is occurring, or it may be determined that the inter-cylinder air-fuel ratio imbalance state is occurring when the it should be determined that the inter-cylinder air-fuel ratio imbalance state is not occurring.

It should be noted that it is inferred that the reason why the responsivity of the air-fuel ratio sensor becomes lower when the air-fuel ratio of the exhaust gas varies within the stoichiometric air-fuel ratio region is that, when the air-fuel ratio of the exhaust gas changes from an "air-fuel ratio (rich air-fuel ratio) richer than the stoichiometric air-fuel ratio" to an "air-fuel ratio (lean air-fuel ratio) leaner than the stoichiometric air-fuel ratio," or vice versa, a direction of the reaction at the exhaust-gas-side electrode layer must change to a reverse direction, and thus, it requires a considerable time for a direction of the Oxygen ions passing through the solid electrolyte layer to be reversed.

Accordingly, one of objects of the present invention is to provide an inter-cylinder air-fuel ratio imbalance determination apparatus (hereinafter, simply referred to as an "apparatus of the present invention") which is capable of performing the inter-cylinder air-fuel ratio imbalance determination with high precision, even when the air-fuel ratio of the exhaust gas fluctuates within the stoichiometric air-fuel ratio region.

One of the aspects of the apparatus of the present invention changes the imbalance determination threshold as indicated by a broken line L2 shown in FIG. 6, for example. That is, one of the aspects of the apparatus of the present invention determines the imbalance determination threshold based on the air-fuel ratio of the exhaust gas while (in a period in which) the air-fuel ratio fluctuation indicating amount is obtained (parameter obtaining period average air-fuel ratio) in such a manner that the imbalance determination threshold becomes smaller as the parameter obtaining period average air-fuel ratio is closer to the stoichiometric air-fuel ratio.

More specifically, one of the aspects of the apparatus of the present invention is applied to a multi-cylinder internal combustion engine having a plurality of cylinders, and comprises an air-fuel ratio sensor, a plurality of fuel injection valves, air-fuel ratio fluctuation indicating amount obtaining means, and imbalance determining means.

The air-fuel ratio sensor is disposed in an exhaust merging portion/portion of an exhaust passage of the engine into which exhaust gases discharged from at least two or more of the cylinders among a plurality of the cylinders merge, or is disposed in the exhaust passage at a location downstream of the exhaust merging portion.

Further, the air-fuel ratio sensor includes an air-fuel ratio detection section having a solid electrolyte layer; an exhaust-gas-side electrode layer formed on one of surfaces of the solid electrolyte layer; a diffusion resistance layer which is formed so as to cover the exhaust-gas-side electrode layer, and which the exhaust gas reaches; and an atmosphere-side electrode layer, which is formed on the other one of the surfaces of the solid electrolyte layer, and which is exposed to an atmosphere chamber. The air-fuel ratio sensor outputs, based on a "limiting current flowing through the solid electrolyte layer, caused by an application of a predetermined voltage between the exhaust-gas-side electrode layer and the atmosphere-side electrode layer", an output corresponding to (in accordance with, indicative of) the air-fuel ratio of the exhaust gas passing through the position/location where the air-fuel ratio sensor is disposed.

Each of a plurality of the fuel injection valves is provided (disposed) corresponding to (or for) each of at least two or more of the cylinders, and injects a fuel contained in a mixture supplied to each of combustion chambers of the two or more of the cylinders. That is, one or more of the fuel injector(s) is/are provided per one cylinder. Each of the fuel injection valves injects the fuel for each of the cylinders to which the fuel injection valve corresponds.

The air-fuel ratio fluctuation indicating amount obtaining means obtains, based on the output value of the air-fuel ratio sensor, an "air-fuel ratio fluctuation indicating amount" whose absolute value becomes larger as a fluctuation of the "air-fuel ratio of the exhaust gas passing/flowing through the location where the air-fuel ratio sensor is disposed" becomes larger.

The air-fuel ratio fluctuation indicating amount may be, but not limited to for example, "a maximum value or an average value" of the absolute values of "the above-described differential values d(Vabyfs)/dt or the above-described differential values d(abyfs)/dt" for a predetermined period (for example, the above mentioned unit combustion cycle period), "a maximum value or an average value" of absolute values of the "second order differential values $d^2$(Vabyfs)/$dt^2$ or second order differential values $d^2$(abyfs)/$dt^2$" for a predetermined period (for example, the above mentioned unit combustion cycle period), a trace length of "the output value Vabyfs or the detected air-fuel ratio abyfs" for a predetermined period (for example, the above mentioned unit combustion cycle period), and the like.

The imbalance determining means compares an "imbalance determination parameter which becomes larger as the absolute value of the obtained air-fuel ratio fluctuation indicating amount becomes larger" with a "predetermined imbalance determination threshold", and determines that an inter-cylinder air-fuel ratio imbalance state has been occurring when the imbalance determination parameter is larger than the imbalance determination threshold.

Further, the imbalance determining means obtains, based on the output value of the air-fuel ratio sensor, an average value of the air-fuel ratio of the exhaust gas passing through the location where the air-fuel ratio sensor is disposed (i.e., the parameter obtaining period average air-fuel ratio) while the air-fuel ratio fluctuation indicating amount is being obtained. Furthermore, the imbalance determining means includes threshold determining means for determining, based on the parameter obtaining period average air-fuel ratio, the imbalance determination threshold in such a manner that the imbalance determination threshold becomes smaller as the parameter obtaining period average air-fuel ratio is closer to the stoichiometric air-fuel ratio (for example, refer to the line L2 shown in FIG. 6).

According to this configuration described above, when the air-fuel ratio fluctuation indicating amount becomes smaller due to the impaired responsiveness of the air-fuel ratio sensor despite that the cylinder-by-cylinder air-fuel ratio difference is constant (the degree of the inter-cylinder air-fuel ratio imbalance state is constant), and thus, when the imbalance determination parameter becomes smaller, the imbalance determination threshold becomes smaller. Consequently, the apparatus can determine whether or not the inter-cylinder air-fuel ratio imbalance state has been occurring with high accuracy.

In this case, it is preferable that the imbalance determining means include imbalance determination parameter obtaining means for obtaining (determining), as the imbalance determination parameter, a "value obtained by correcting the air-fuel ratio fluctuation indicating amount based on the parameter obtaining period average air-fuel ratio" in such a manner that the air-fuel ratio fluctuation indicating amount is made (becomes) larger as the parameter obtaining period average air-fuel ratio is closer to the stoichiometric air-fuel ratio.

The configuration described above can reduce a difference between the imbalance determination parameter obtained while the parameter obtaining period average air-fuel ratio is a value greatly deviating (far) from the stoichiometric air-fuel ratio and the imbalance determination parameter obtained while the parameter obtaining period average air-fuel ratio is very close to the stoichiometric air-fuel ratio, while the cylinder-by-cylinder air-fuel ratio difference is constant. Accordingly, the imbalance determination can be made accurately without greatly changing the imbalance determination threshold.

Another of the aspects of the apparatus of the present invention, similarly to the one of the aspects of the apparatus of the present invention, comprises the air-fuel ratio sensor, a plurality of the fuel injection valves, and the air-fuel ratio fluctuation indicating amount obtaining means.

Further, this aspect comprises imbalance determining means for comparing an imbalance determination parameter which becomes larger as an absolute value of the obtained air-fuel ratio fluctuation indicating amount becomes larger with a predetermined imbalance determination threshold, and determines that an inter-cylinder air-fuel ratio imbalance state has been occurring when the imbalance determination parameter is larger than the imbalance determination threshold.

In addition, the imbalance determining means includes imbalance determination parameter obtaining means for obtaining, based on the output value of the air-fuel ratio sensor, a parameter obtaining period average air-fuel ratio which is an average value of the air-fuel ratio of the exhaust gas passing through the location where the air-fuel ratio sensor is disposed while the air-fuel ratio fluctuation indicating amount is being obtained, and obtaining (determining), as the imbalance determination parameter, a value obtained by correcting the air-fuel ratio fluctuation indicating amount based on the parameter obtaining period average air-fuel ratio in such a manner that the air-fuel ratio fluctuation indicating amount is made (becomes) larger as the parameter obtaining period average air-fuel ratio is closer to the stoichiometric air-fuel ratio.

According to this configuration described above, the imbalance determination parameter which is nearly constant can be obtained as long as the cylinder-by-cylinder air-fuel ratio difference is constant (i.e., the degree of the inter-cylinder air-fuel ratio imbalance state is constant), regardless of whether the responsiveness of the air-fuel ratio sensor is high or low. In other words, when the cylinder-by-cylinder air-fuel ratio difference is constant, a difference can be reduced between the imbalance determination parameter obtained while the parameter obtaining period average air-fuel ratio is a value greatly deviating (far) from the stoichiometric air-fuel ratio and the imbalance determination parameter obtained while the parameter obtaining period average air-fuel ratio is very close to the stoichiometric air-fuel ratio. Accordingly, the imbalance determination can be made accurately without changing the imbalance determination threshold.

In the apparatus of the present invention, the air-fuel ratio detection section of the air-fuel ratio sensor includes a catalyst section which accelerates an oxidation-reduction reaction and has an oxygen storage function; and the air-fuel ratio sensor is configured so as to lead the exhaust gas flowing in the exhaust passage to the diffusion resistance layer through (v*ia*) the catalyst section.

For example, when the rich-side-deviated imbalance state occurs, the average of the air-fuel ratio of the exhaust gas changes to a certain rich air-fuel ratio. In this case, a large amount of unburned combustibles including Hydrogen are generated, compared to a case where each of air-fuel ratios of all of the cylinders changes to the certain air-fuel ratio without exception. Hydrogen has a small molecule size, and therefore, passes through the diffusion resistance layer of the air-fuel ratio detection, section more easily than the other unburned combustibles. Accordingly, the output value of the air-fuel ratio sensor changes to a value corresponding to an air-fuel ratio which is further richer than that certain rich air-fuel ratio. Consequently, an air-fuel ratio feedback control based on the output value of the air-fuel ratio sensor can not be carried pout properly.

In view of the above, when the catalyst section is provided to the air-fuel ratio sensor, the catalyst section can oxidize the excessive hydrogen, and the excessive hydrogen can be reduced. As a result, the output value of the air-fuel sensor comes close to a value representing the air-fuel ratio of the exhaust gas accurately.

However, a "change in the output value of the air-fuel ratio sensor with respect to a variation in the air-fuel ratio of the exhaust gas" is delayed, due to the oxidation reduction reaction and the oxygen storage function of the catalytic section. As a result, the responsivity of the air-fuel ratio sensor is lowered (becomes slower), compared to the air-fuel ratio sensor which does not comprise the catalytic section. The delay in the output value of the air-fuel ratio sensor becomes notably longer due to the oxygen storage function, especially when the air-fuel ratio of the exhaust gas fluctuates with crossing up and down the stoichiometric air-fuel ratio. Accordingly, when the parameter obtaining period average air-fuel ratio is close to the stoichiometric air-fuel ratio, the air-fuel ratio fluctuation indicating amount becomes much smaller, and the imbalance determination parameter also becomes much smaller. In view of the above, the apparatus of the present invention can provide a significant advantage in a case where the imbalance determination is carried out using the air-fuel ratio fluctuation indicating amount and the imbalance determination parameter, both obtained based on the output value of the air-fuel ratio sensor, in the internal combustion engine having the air-fuel ratio sensor including the above described catalytic section.

Furthermore, the air-fuel sensor often comprises a protective cover, which accommodates the air-fuel ratio detecting section in its inside so as to cover the air-fuel detecting section, and which includes inflow holes for the exhaust gas passing through the exhaust gas passage to flow into the inside of the cover and outflow holes for the exhaust gas flowed into the inside of the cover to flow out to the exhaust gas passage.

In this case, it is preferable that the air-fuel ratio fluctuation indicating amount obtaining means be configured so as to obtain, as a base indicating amount, a differential value of "the output value of the air-fuel ratio sensor or the detected air-fuel ratio which is an air-fuel ratio represented by the output value" with respect to time, and so as to obtain the air-fuel ratio fluctuation indicating amount based on the obtained base indicating amount.

As long as the cylinder-by-cylinder air-fuel ratio difference is not equal to "0", the output value Vabyfs of the air-fuel ratio sensor fluctuates with a period of the unit combustion cycle period. The trace length of the output value Vabyfs is therefore strongly affected by the engine rotational speed. Accordingly, it is necessary to set the imbalance determination threshold in accordance with the engine rotational speed with high precision.

In contrast, if the air-fuel ratio sensor has the protective cover, a flow rate of the exhaust gas inside of the protective cover does not vary depending on the engine rotational speed, but varies depending on a flow rate of an exhaust gas flowing in the exhaust gas (and thus, the intake air flow rate). This is because the exhaust gas inflows through the inflow holes of the protective cover into the inside of the protective cover owing to a negative pressure caused by the exhaust gas flowing in the vicinity of the outflow holes of the protective cover.

Accordingly, if the intake air flow rate is constant, "the differential value d(Vabyfs)/dt of the output value of the air-fuel ratio sensor with respect to time or the differential value d(abyfs)/dt of the detected air-fuel ratio which is the air-fuel ratio represented by the output value of the air-fuel ratio sensor with respect to time" represents the fluctuation of the air-fuel ratio of the exhaust gas with high precision regardless of the engine rotational speed. Therefore, when the differential value of these values is obtained as the base indicating amount, and the air-fuel ratio fluctuation indicating amount is obtained based on the obtained base indicating amount, the air-fuel ratio fluctuation indicating amount and the imbalance determination parameter varying depending on the air-fuel ratio fluctuation indicating amount can be obtained as a value indicating the cylinder-by-cylinder air-fuel ratio difference with high precision regardless of the engine rotational speed.

Alternatively, it is preferable that the air-fuel ratio fluctuation indicating amount obtaining means be configured so as to obtain, as a base indicating amount, a second order differential value of "the output value of the air-fuel ratio sensor or the detected air-fuel ratio which is an air-fuel ratio represented by the output value" with respect to time, and so as to obtain the air-fuel ratio fluctuation indicating amount based on the obtained base indicating amount.

The second order differential value of the output value of the air-fuel ratio sensor with respect to time or the second order differential value of the detected air-fuel ratio which is the air-fuel ratio represented by the output value with respect to, time is hardly affected by a moderate change in the average of the air-fuel ratio of the exhaust gas. Accordingly, when the second order differential value of these values is obtained as the base indicating amount, and the air-fuel ratio fluctuation indicating amount is obtained based on the obtained base indicating amount, the air-fuel ratio fluctuation indicating amount and the imbalance determination parameter varying depending on the air-fuel ratio fluctuation indicating amount can be obtained as a "value indicating the cylinder-by-cylinder air-fuel ratio difference with high precision", even when the center of the air-fuel ratio of the exhaust gas is changing.

MODE FOR CARRYING OUT THE INVENTION

An inter-cylinder air-fuel ratio imbalance determination apparatus (hereinafter may be simply referred to as a "determination apparatus") for an internal combustion engine according to each of embodiments of the present invention will be described with reference to the drawings. This determination apparatus is a portion of an air-fuel ratio control apparatus for controlling an air-fuel ratio of gas mixture supplied to the internal combustion engine (air-fuel ratio of the engine), and also serves as a portion of a fuel injection amount control apparatus for controlling an amount of fuel injection.

First Embodiment (Configuration)

Figure 7:
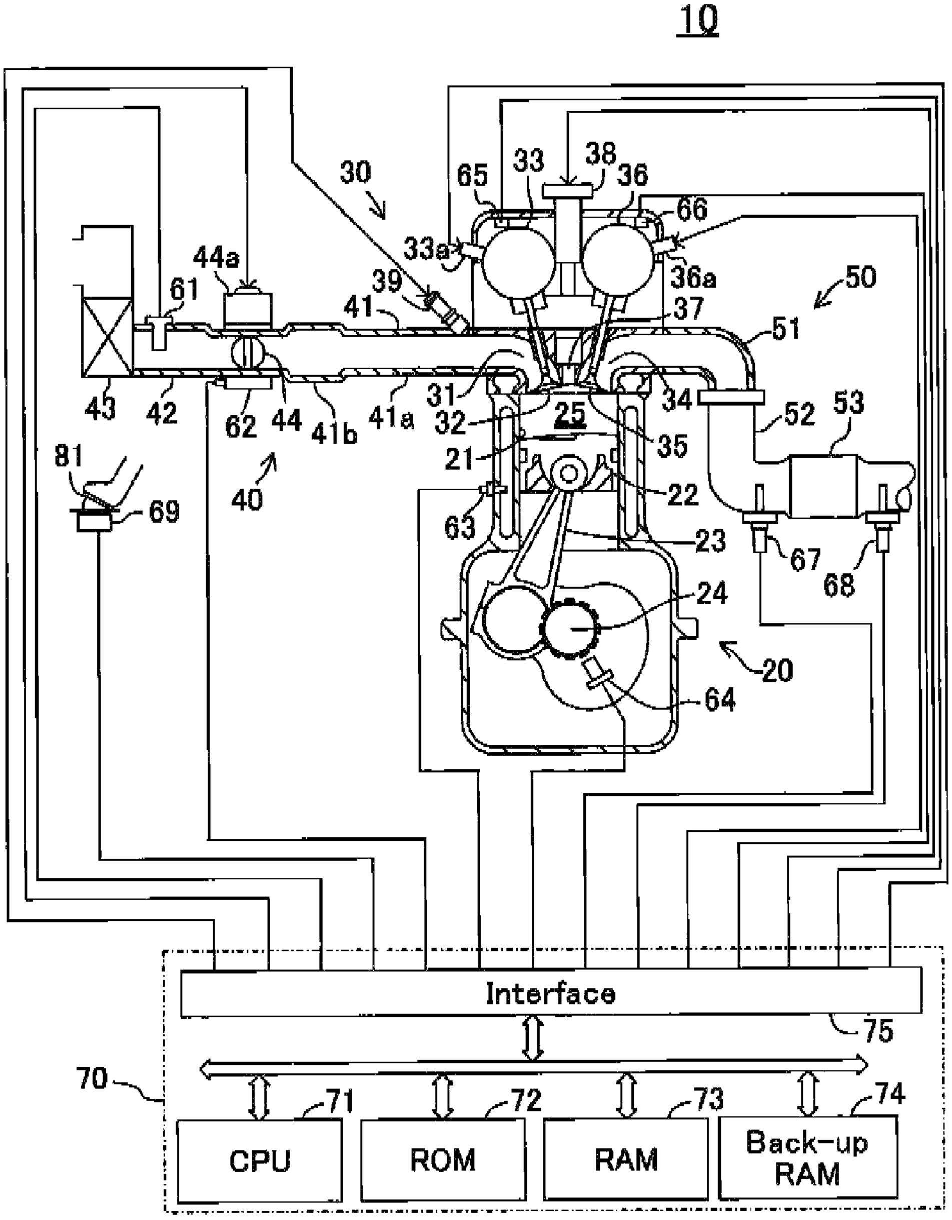
FIG. 7 is a diagram schematically showing the configuration of the internal combustion engine shown in FIG. 1.

FIG. 7 schematically shows a configuration of a system configured such that a determination apparatus according to a first embodiment (hereinafter also referred to as a "first determination apparatus") is applied to a spark-ignition multi-cylinder (straight 4-cylinder) four-cycle internal combustion engine 10. Although FIG. 7 shows a cross section of a specific cylinder only, the remaining cylinders have the same configuration.

This internal combustion engine 10 includes a cylinder block section 20 including a cylinder block, a cylinder block lower-case, an oil pan, etc.; a cylinder head section 30 fixedly provided on the cylinder block section 20; an intake system 40 for supplying gasoline gas mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the respective connecting rod 23, whereby the crankshaft 24 is rotated. The wall surface of the cylinder 21 and the top surface of the piston 22 form a combustion chamber 25 in cooperation with the lower surface of the cylinder head section 30.

The cylinder head section 30 includes an intake port 31 communicating with the combustion chamber 25; an intake valve 32 for opening and closing the intake port 31; a variable intake timing control apparatus 33 which includes an intake camshaft for driving the intake valve 32 and which continuously changes the phase angle of the intake camshaft; an actuator 33$a$ of the variable intake timing control apparatus 33; an exhaust port 34 communicating with the combustion chamber 25; an exhaust valve 35 for opening and closing the exhaust port 34; a variable exhaust timing control apparatus 38 which includes an exhaust camshaft for driving the exhaust valve 35 and which continuously changes the phase angle of the exhaust camshaft; an actuator 36$a$ of the variable exhaust timing control apparatus 36; a spark plug 37; an igniter 38 including an ignition coil for generating a high voltage to be applied to the spark plug 37; and a fuel injection valve (fuel injection means; fuel supply means) 39.

The fuel injection valves (fuel injectors) 39 are disposed such that a single fuel injection valve is provided for each combustion chamber 25. The fuel injection valve 39 is provided at the intake portion 31. When the fuel injection valve 39 is normal, the fuel injection valve 39 injects "fuel of an amount corresponding to an instructed fuel injection amount contained in the injection instruction signal" into the corresponding intake port 31 in response to an injection instruction signal. As described above, each of a plurality of the cylinders has the fuel injection valve 39 which supplies fuel thereto independently of other cylinders.

The intake system 40 includes an intake manifold 41, an intake pipe 42, an air filter 43, and a throttle valve 44.

Figure 1:
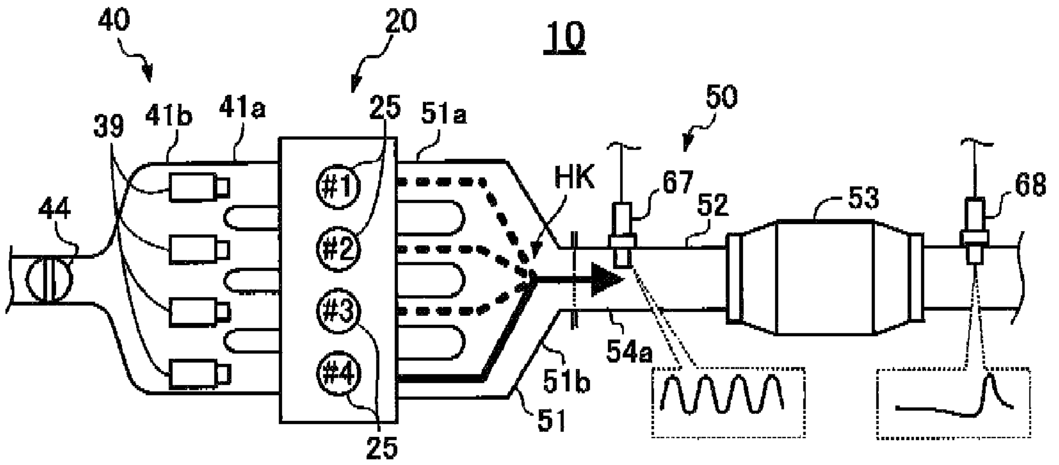
FIG. 1 is a schematic plan view of an internal combustion engine to which the inter-cylinder air-fuel ratio imbalance determination apparatus according to each of embodiments of the present invention is applied.

As shown in FIG. 1, the intake manifold 41 is comprises a plurality of branch portions 41$a$ and a surge tank 41$b$. As shown in FIG. 7, one end of each branch portion 41$a$ is connected to the corresponding intake port 31. The other end of each branch portion 41$a$ is connected to the surge tank 41$b$. One end of the intake pipe 42 is connected to the surge tank 41$b$. The air filter 43 is provided at the other end of the intake pipe 42. The throttle valve 44 is provided within the intake pipe 42 and adapted to change the opening cross sectional area of the intake passage. The throttle valve 44 is rotated within the intake pipe 42 by a throttle valve actuator 44$a$ (a portion of throttle valve drive means) including a DC motor.

The exhaust system 50 includes an exhaust manifold 51; an exhaust pipe 52; an upstream catalyst 53 disposed in the exhaust pipe; and an unillustrated downstream catalyst disposed in the exhaust pipe at a position downstream of the upstream catalyst 53.

As shown in FIG. 1, the exhaust manifold 51 has a plurality of branch portions 51$a$, each of which is connected at each of the exhaust ports, and merging portion 51$b$ where the other ends of all of the branch portions 51$a$ merge. This merging portion 51$b$ is also referred to as an exhaust merging portion HK because exhaust gases discharged from a plurality (two or more, four in the present example) of the cylinders merge into the portion 51$b$. The exhaust pipe 52 is connected to the merging portion 51$b$. As shown in FIG. 7, the exhaust ports 34, the exhaust manifold 51, and the exhaust pipe 52 constitute an exhaust passage.

Each of the upstream catalyst 53 and the downstream catalyst is a so-called three-way catalyst unit (exhaust purifying catalyst) carrying an active component formed of a noble metal (catalytic material) such as platinum, rhodium, and palladium. Each of the catalysts has a function of oxidizing unburned combustibles, such as HC, CO, and $H_2$ and reducing nitrogen oxides (NOx), when the air-fuel ratio of a gas flowing into each catalyst is the stoichiometric air-fuel ratio. This function is also called a catalytic function. Furthermore, each of the catalysts has an oxygen storage function of occluding (storing) oxygen. This oxygen storage function enables removal/purification of the unburned combustibles and the nitrogen oxides even when the air-fuel ratio deviates from the stoichiometric air-fuel ratio. This oxygen storage function is realized by ceria ($CeO_2$) carried/supported by the catalyst.

Referring back to FIG. 7 again, this system includes a hot-wire air flowmeter 61; a throttle position sensor 62; a water temperature sensor 63; a crank position sensor 64; an intake-cam position sensor 65; an exhaust-cam position sensor 66; an upstream air-fuel ratio sensor 67; a downstream air-fuel ratio sensor 68; and an accelerator opening sensor 69.

The air flowmeter 61 outputs a signal representing the mass flow rate (intake air flow rate) Ga of intake air flowing through the intake pipe 42. That is, the intake air flow rate Ga represents the amount of air taken into the engine 10 per unit time.

The throttle position sensor 62 detects the opening of the throttle valve 44 (throttle valve opening), and outputs a signal representing the throttle valve opening TA.

The water temperature sensor 63 detects the temperature of cooling water of the internal combustion engine 10, and outputs a signal representing the cooling water temperature THW.

The crank position sensor 64 outputs a signal including a narrow pulse generated every time the crankshaft 24 rotates 10° and a wide pulse generated every time the crankshaft 24 rotates 360°. This signal is converted to an engine rotational speed NE by an electric controller 70, which will be described later.

The intake-cam position sensor 65 outputs a single pulse when the intake camshaft rotates 90 degrees from a predetermined angle, when the intake camshaft rotates 90 degrees after that, and when the intake camshaft further rotates 180 degrees after that On the basis of the signals from the crank position sensor 64 and the intake-cam position sensor 65, the electric controller 70, which will be described later, obtains the absolute crank angle CA, while using, as a reference, the compression top dead center of a reference cylinder (e.g., the first cylinder). This absolute crank angle CA is set to a "0° crank angle" at the compression top dead center of the reference cylinder, increases up to a 720° crank angle in accordance with the rotational angle of the crank angle, and is again set to the "0° crank angle" at that point in time.

The exhaust-cam position sensor 66 outputs a single pulse when the exhaust camshaft rotates 90 degrees from a predetermined angle, when the exhaust camshaft rotates 90 degrees after that, and when the exhaust camshaft further rotates 180 degrees after that.

As also shown in FIG. 1, the upstream air-fuel ratio sensor 67 (the air-fuel ratio sensor in the present invention) is disposed in "either one of the exhaust manifold 51 and the exhaust pipe 52 (that is, the exhaust passage)" to be located at a position between the upstream catalyst 53 and the merging portion 51$b$ (exhaust merging portion HK) of the exhaust manifold 51. The air-fuel ratio sensor 67 is a "limiting-current-type wide range air-fuel ratio sensor including a diffusion resistance layer" disclosed in, for example, Japanese Patent Application Laid-Open (kokai) Nos. H11-72473, 2000-65782, and 2004-69547.

Figure 8:
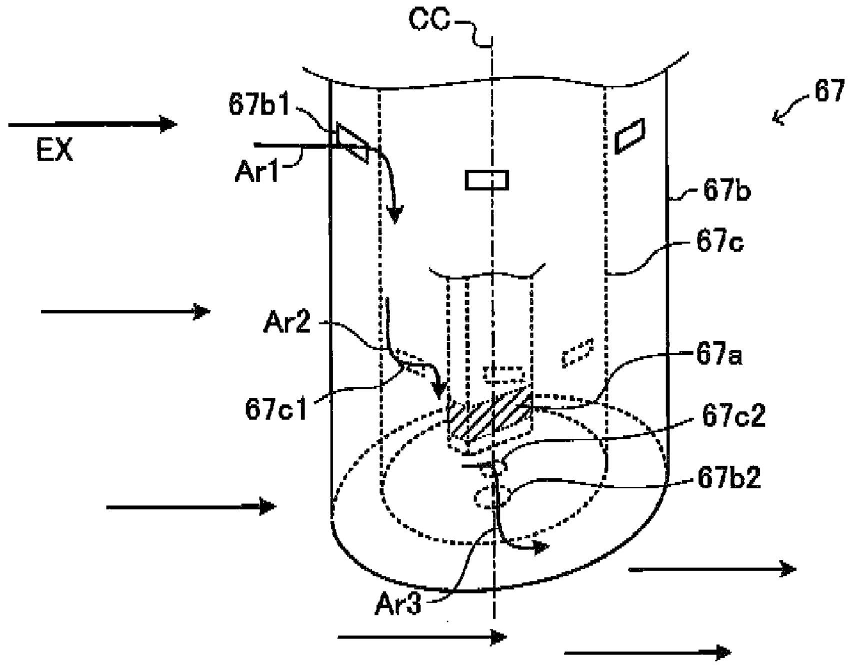
FIG. 8 is a partial schematic perspective view (through-view) of the air-fuel ratio sensor (upstream air-fuel ratio sensor) shown in FIGS. 1 and 7.
Figure 9:
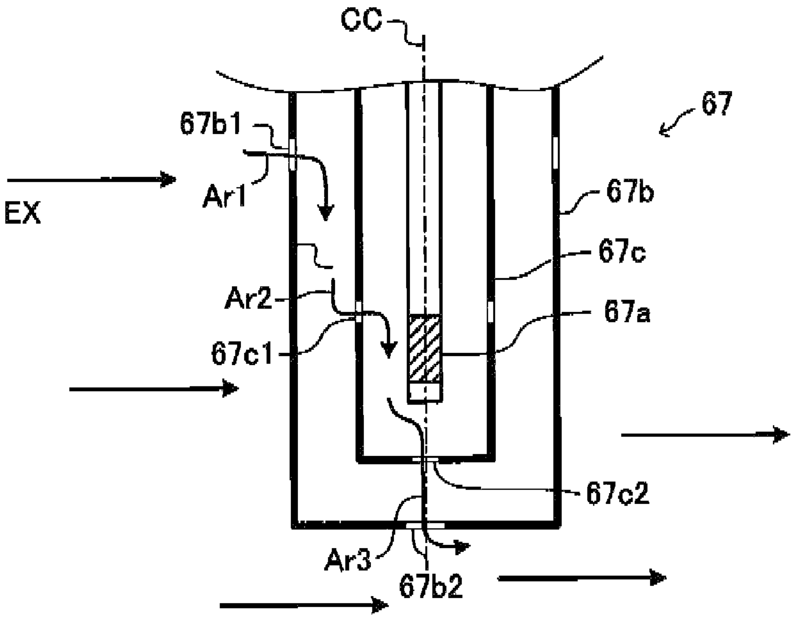
FIG. 9 is a partial sectional view of the air-fuel ratio sensor shown in FIGS. 1 and 7.

As shown in FIGS. 8 and 9, the upstream air-fuel ratio sensor 67 includes an air-fuel ratio detection section 67$a$, an outer protective cover 67$b$, and an inner protective cover 67$c$.

The outer protective cover 67$b$ is a hollow cylinder formed of metal. The outer protective cover 67$b$ accommodates the inner protective cover 67$c$ so as to cover it. The outer protective cover 67$b$ has a plurality of inflow holes 67$b$1 formed in its peripheral wall. The inflow holes 67$b$1 are through holes for allowing the exhaust gas EX (the exhaust gas which is present outside the outer protective cover 67$b$) flowing through the exhaust passage to flow into a space inside the outer protective cover 67_b_. Further, the outer protective cover 67_b_ has an outflow hole 67_b_2 formed in its bottom wall so as to allow the exhaust gas to flow from the space inside the outer protective cover 67_b_ to the outside (exhaust passage).

The inner protective cover 67_c_ formed of metal is a hollow cylinder whose diameter is smaller than that of the outer protective cover 67_b_. The inner protective cover 67_c_ accommodates an air-fuel ratio detection section 67_a_ so as to cover it. The inner protective cover 67_c_ has a plurality of inflow holes 67_c_1 in its peripheral wall. The inflow holes 67_c_1 are through holes for allowing the exhaust gas—which has flowed into the "space between the outer protective cover 67_b_ and the inner protective cover 67_c_" through the Inflow holes 67_b_1 of the outer protective cover 67_b_—to flow into a space inside the inner protective cover 67_c_. In addition, the inner protective cover 67_c_ has an outflow hole 67_c_2 formed in its bottom wall so as to allow the exhaust gas to flow from the space inside the inner protective cover 67_c_ to the outside.

Figure 2:
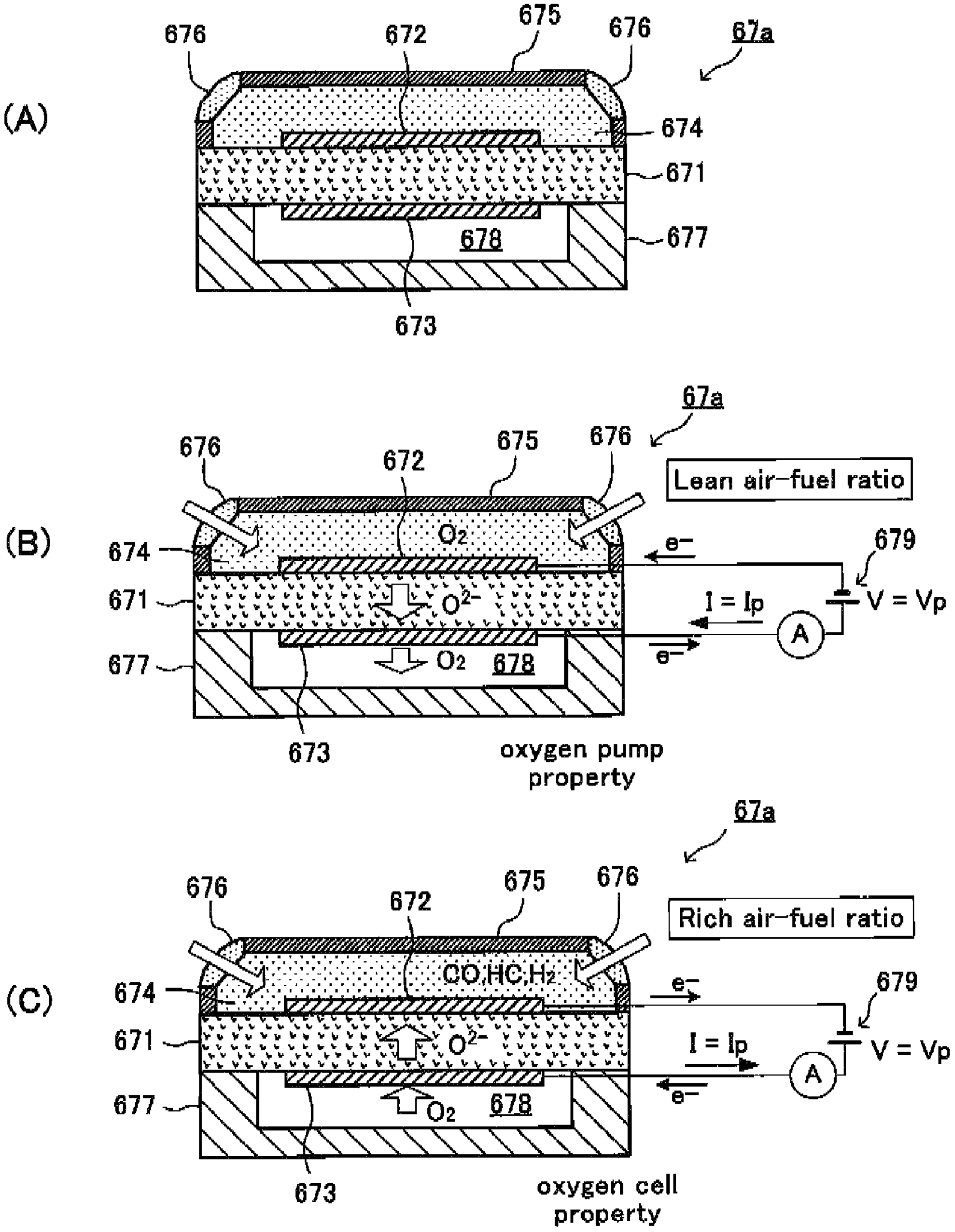
FIG. 2 (A) to (C) of FIG. 2 are schematic sectional views of an air-fuel ratio detection section which the air-fuel ratio sensor (upstream air-fuel ratio sensor) shown in FIG. 1 includes.

As shown in (A) to (C) of FIG. 2, the air-fuel ratio detection section 67_a_ includes a solid electrolyte layer 871, an exhaust-gas-side electrode layer 672, an atmosphere-side electrode layer 673, a diffusion resistance layer 674, and a first partition section 675, a catalytic section 676, and a second partition section 677.

The solid electrolyte layer 671 is formed of an oxygen-ion-conductive sintered oxide. In this embodiment, the solid electrolyte layer 671 is a "stabilized zirconia element" which is a solid solution of $ZrO_2$ (zirconia) and CaO (stabilizer). The solid electrolyte layer 671 exhibits an "oxygen cell property" and an "oxygen pump property," which are well known, when its temperature is equal to or higher than an activation temperature thereof.

The exhaust-gas-side electrode layer 672 is formed of a noble metal having a high catalytic activity, such as platinum (Pt). The exhaust-gas-side electrode layer 672 is formed on a first surface of the solid electrolyte layer 671. The exhaust-gas-side electrode layer 672 is formed through chemical plating, etc. so as to exhibit a sufficient degree of permeability (that is, it is formed into a porous layer).

The atmosphere-side electrode layer 673 is formed of a noble metal having a high catalytic activity, such as platinum (Pt). The atmosphere-side electrode layer 673 is formed on a second surface of the solid electrolyte layer 671 in such a mariner it faces the exhaust-gas-side electrode layer 672 across the solid electrolyte layer 671. The atmosphere-side electrode layer 673 is formed through chemical plating, etc. so as to exhibit adequate permeability (that is, it is formed into a porous layer).

The diffusion resistance layer (diffusion-controlling layer) 674 is formed of a porous ceramic material (heat-resistant inorganic material). The diffusion resistance layer 874 is formed through, for example, plasma spraying in such a manner that it covers the outer surface of the exhaust-gas-side electrode layer 672.

The first partition section 675 is formed of dense and gas-nonpermeable alumina ceramic. The first partition section 675 is formed so as to cover the diffusion resistance layer 874 except corners (portions) of the diffusion resistance layer 674. That is, the first partition section 675 has pass-through portions which expose portions of the diffusion resistance layer 674 to outside.

The catalytic section 676 is formed in the pass-through portions of the first partition section 675 so as to close the pass-through portions. The catalytic section 676 includes the catalytic substance which facilitates an oxidation-reduction reaction and a substance for storing oxygen which exerts the oxygen storage function, similarly to the upstream catalyst 53. The catalytic section 876 is porous. Accordingly, as shown by a white painted arrow in (B) and (C) of FIG. 2, the exhaust gas (the above described exhaust gas flowing into the inside of the inner protective cover 670) reaches the diffusion resistance layer 674 through the catalytic section 676, and then further reaches the exhaust-gas-side electrode layer 672 through the diffusion resistance layer 674.

The second partition section 677 is formed of dense and gas-nonpermeable alumina ceramic. The second partition section 677 is configured so as to form an "atmosphere chamber 678" which is a space that accommodates the atmosphere-side electrode layer 673. Air is introduced into the atmosphere chamber 678.

A power supply 679 is connected to the upstream air-fuel ratio sensor 67. The power supply 679 applies a voltage V (=Vp) in such a manner that the atmosphere-side electrode layer 673 is held at a high potential and the exhaust gas-side electrode layer 672 is held at a low potential.

Figure 3:
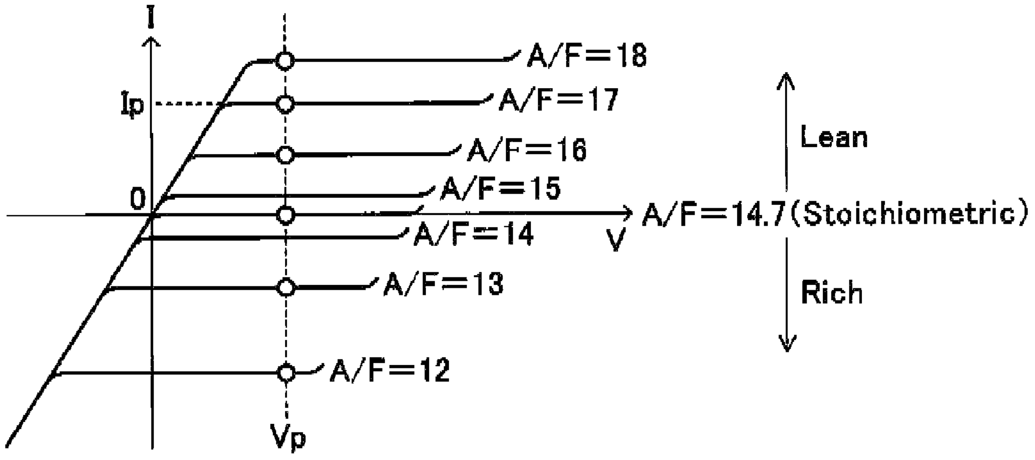
FIG. 3 is a graph showing a relation between an air-fuel ratio of an exhaust gas and a limiting current of an air-fuel ratio sensor.

As shown in (B) of FIG. 2, when the air-fuel ratio of the exhaust gas is leaner than the stoichiometric air-fuel ratio, the thus configured upstream air-fuel ratio sensor 67 ionizes oxygen which has reached the exhaust-gas-side electrode layer 672 through the diffusion resistance layer 674, and makes the ionized oxygen reach the atmosphere-side electrode layer 673. As a result, an electrical current I flows from a positive electrode of the electric power supply 679 to a negative electrode of the electric power supply 679. As shown in FIG. 3, the magnitude of the electrical current I becomes a constant value which is proportional to a concentration of oxygen arriving at the exhaust-gas-side electrode layer 672 (or a partial pressure, the air-fuel ratio of the exhaust gas), when the electric voltage V is set at a predetermined value Vp or higher. The upstream air-fuel ratio sensor 67 outputs a value into which this electrical current (i.e., the limiting current Ip) is converted, as its output value Vabyfs.

To the contrary, as shown in (C) of FIG. 2, when the air-fuel ratio of the exhaust gas is richer than the stoichiometric air-fuel ratio, the upstream air-fuel ratio sensor 67 ionizes oxygen which is present in the atmosphere chamber 678 and makes the ionized oxygen reach the exhaust-gas-side electrode layer 672 so as to oxide the unburned combustibles (HC, CO, and $H_2$, etc.) reaching the exhaust-gas-side electrode layer 672 through the diffusion resistance layer 674. As a result, an electrical current I flows from the negative electrode of the electric power supply 679 to the positive electrode of the electric power supply 679. As shown in FIG. 3, the magnitude of the electrical current I also becomes a constant value which is proportional to a concentration of the unburned combustibles arriving at the exhaust-gas-side electrode layer 672 (i.e., the air-fuel ratio of the exhaust gas), when the electric voltage V is set at the predetermined value Vp or higher. The upstream air-fuel ratio sensor 67 outputs a value into which the electrical current (i.e., the limiting current Ip) is converted, as its output value Vabyfs.

Figure 4:
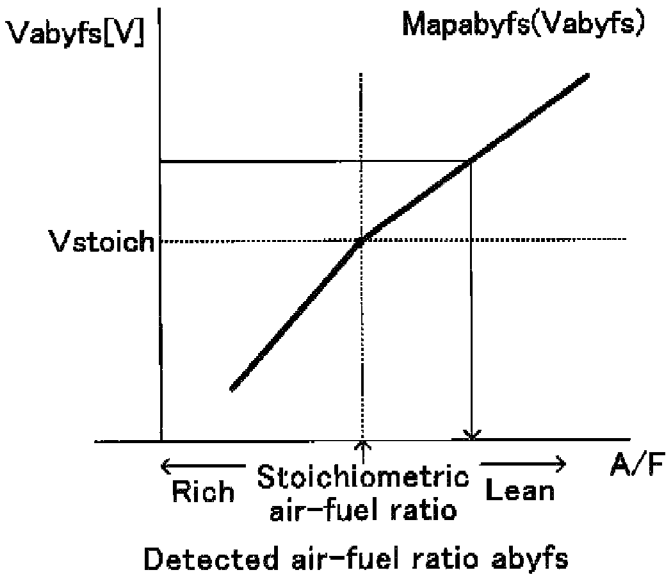
FIG. 4 is a graph showing a relation between the air-fuel ratio of the exhaust gas and an output value of the air-fuel ratio sensor.

That is, the air-fuel detection section 67_a_, as shown in FIG. 4, outputs, as "an air-fuel ratio sensor output", the output value Vabyfs being in accordance with the air-fuel ratio (an upstream air-fuel ratio abyfs, a detected air-fuel ratio abyfs) of the gas which is flowing at the position at which the upstream air-fuel ratio sensor 67 is disposed and is reaching the air-fuel detection section 67_a_ through the inflow holes 67_b_1 of the outer protective cover 67_b_ and the inflow holes 67_c_1 of the inner protective cover 67_c_. The output value Vabyfs becomes larger as the air-fuel ratio of the gas reaching the air-fuel ratio detection section 67_a_ becomes larger (leaner). That is, the output value Vabyfs is substantially proportional to the air-fuel ratio of the exhaust gas reaching the air-fuel ratio detection section 67a. It should be noted that the output value Vabyfs becomes equal to a stoichiometric air-fuel ratio corresponding value Vstoich, when the detected air-fuel ratio abyfs is equal to the stoichiometric air-fuel ratio.

The electric controller 70 stores an air-fuel ratio conversion table (map) Mapabyfs shown in FIG. 4, and detects an actual upstream air-fuel ratio abyfs (that is, obtains the detected air-fuel ratio abyfs) by applying the output value Vabyfs of the air-fuel ratio sensor 67 to the air-fuel ratio conversion table Mapabyfs.

Meanwhile, the upstream air-fuel ratio sensor 67 is disposed in such a manner that the outer protective cover 67b is exposed in either the exhaust manifold 51 or the exhaust pipe 52 at the position between the exhaust gas merging portion HK of the exhaust manifold 51 and the upstream catalyst 53.

More specifically, as shown in FIGS. 8 and 9, the air-fuel ratio sensor 67 is disposed in the exhaust passage in such a manner that the bottom surface of the protective cover (67b, 67c) are parallel to a flow of the exhaust gas EX, and a center axis CC of the protective covers (67b, 67c) is perpendicular to the flow of the exhaust gas EX. Accordingly, the exhaust gas EX within the exhaust passage which has reached the inflow holes 67b1 of the outer protective cover 67b is sucked into the inside of the outer protective cover 67b and the inner protective cover 67c owing to the flow (stream) of the exhaust gas EX flowing in the vicinity of the outflow holes 67b2 of the outer protective cover 67b.

Accordingly, the exhaust gas EX flowing through the exhaust gas passage flows into the space between the outer protective cover 67b and the inner protective cover 67c via inflow holes 67b1 of the outer protective cover 67b, as shown by an arrow Ar1 in FIGS. 8 and 9. Subsequently, the exhaust gas, as shown by an arrow Ar2, flows into the "inside of the inner protective cover 67c" via the "inflow holes 67c1 of the inner protective cover 67c", and thereafter, reaches the air-fuel ratio detection section 67a. Then, the exhaust gas, as shown by an arrow Ar3, flows out to the exhaust gas passage via the outflow holes 67c2 of the inner protective cover 67c and the outflow holes 67b2 of the outer protective cover 67b.

Thus, a flow rate of the exhaust gas in "the outer protective cover 67b and inner protective cover 67c" varies depending on the flow rate of the exhaust gas EX flowing in the vicinity of the outflow holes 67b2 of the outer protective cover 67b (and accordingly, depending on the intake air-flow rate Ga which is the intake air amount per unit time). In other words, a time duration from a "point in time at which an exhaust gas having a specific air-fuel ratio (first exhaust gas) reaches the inflow holes 67b1" to a "point in time at which the first exhaust gas reaches the air-fuel ratio detection section 67a" depends on the intake air-flow rate Ga, but does not depend on the engine rotational speed NE. Accordingly, the output responsivity (responsivity) of the air-fuel ratio sensor 67 with respect to the "air-fuel ratio of the exhaust gas flowing through the exhaust passage" becomes higher (better) as the flow amount (flow rate) of the exhaust gas flowing in the vicinity of the outer protective cover 67b of the air-fuel ratio sensor 67 becomes greater. This can be true even when the upstream air-fuel ratio sensor 67 has the inner protective cover 67c only.

Referring back to FIG. 7, the downstream air-fuel ratio sensor 68 is disposed in the exhaust pipe 52, at a position downstream of the upstream catalyst 53 and upstream of the downstream catalyst (i.e., in the exhaust passage between the upstream catalyst 53 and the downstream catalyst). The downstream air-fuel ratio sensor 68 is a well-known electromotive-force-type oxygen concentration sensor (a well-known concentration-cell-type oxygen concentration sensor using stabilized zirconia). The downstream air-fuel ratio sensor 68 is designed to generate an output value Voxs corresponding to the air-fuel ratio of a gas to be detected; i.e., the gas which flows through a portion of the exhaust passage where the downstream air-fuel ratio sensor 68 is disposed (that is, the air-fuel ratio of the gas which flows out of the upstream catalyst 53 and flows into the downstream catalyst; namely, a time average of the air-fuel ratio of the mixture supplied to the engine).

Figure 10:
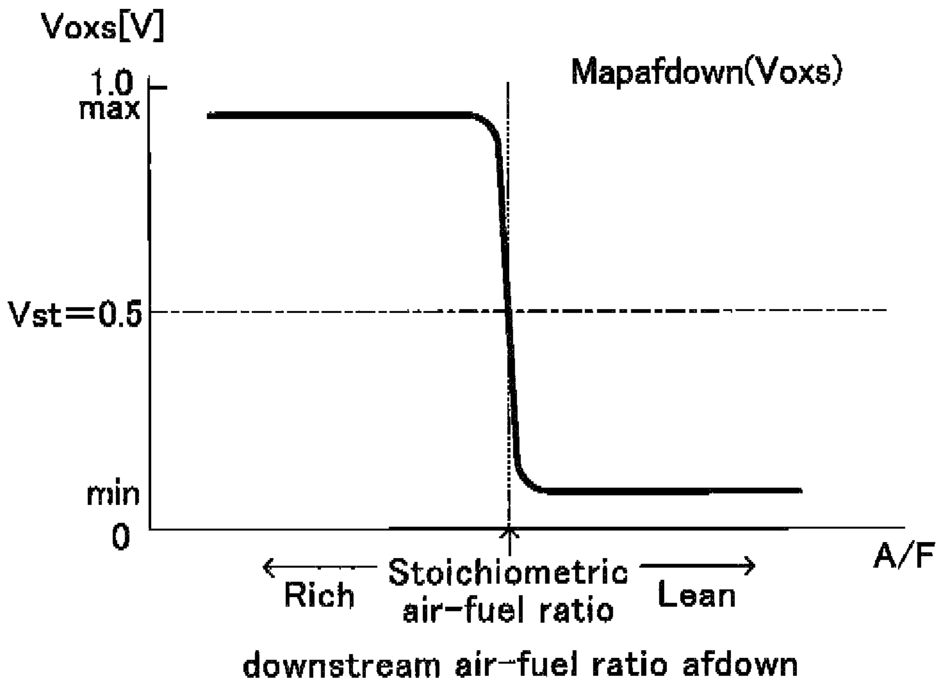
FIG. 10 is a graph showing a relation between an air-fuel ratio of an exhaust gas and an output value of the downstream air-fuel ratio sensor shown in FIGS. 1 and 7.

As shown in FIG. 10, this output value Voxs becomes a maximum output value max (e.g., about 0.9 V) when the air-fuel ratio of the gas to be detected is richer than the stoichiometric air-fuel ratio, becomes a minimum output value min (e.g., about 0.1 V) when the air-fuel ratio of the gas to be detected is leaner than the stoichiometric air-fuel ratio, and becomes a voltage Vst (midpoint voltage Vst, e.g., about 0.5 V) which is approximately the midpoint value between the maximum output value max and the minimum output value min when the air-fuel ratio of the gas to be detected is the stoichiometric air-fuel ratio. Further, this voltage Vox changes suddenly from the maximum output value max to the minimum output value min when the air-fuel ratio of the gas to be detected changes from the air-fuel ratio richer than the stoichiometric air-fuel ratio to the air-fuel ratio leaner than the stoichiometric air-fuel ratio, and changes suddenly from the minimum output value min to the maximum output value max when the air-fuel ratio of the gas to be detected changes from the air-fuel ratio leaner than the stoichiometric air-fuel ratio to the air-fuel ratio richer than the stoichiometric air-fuel ratio.

The accelerator opening sensor 69 shown in FIG. 7 is designed to output a signal which indicates the operation amount Accp of the accelerator pedal 81 operated by the driver (accelerator pedal operation amount Accp). The accelerator pedal operation amount Accp increases as the opening (accelerator pedal operation amount) of the accelerator pedal 81 becomes larger.

The electric controller 70 is a well-known microcomputer which includes "a CPU 71; a ROM 72 in which a program executed by the CPU 71, tables (maps and/or functions), constants, etc. are stored in advance; a RAM 73 in which the CPU 71 temporarily stores data as needed; a backup RAM 74; and an interface 75 which includes an AD converter, etc", that are mutually connected via a bus.

The backup RAM 74 is supplied with an electric power from a battery mounted on a vehicle on which the engine 10 is mounted, regardless of a position (off-position, start position, on-position, and so on) of an unillustrated ignition key switch of the vehicle. While the electric power is supplied to the backup RAM 74, data is stored in (written into) the backup RAM 74 according to an instruction of the CPU 71, and the backup RAM 74 holds (retains, stores) the data in such a manner that the data can be read out When the battery is taken out from the vehicle, and thus, when the backup RAM 74 is not supplied With the electric, power, the backup RAM 74 can not hold the data. Accordingly, the CPU 71 initializes the data to be stored (sets the data to default values) in the backup RAM 74 when the electric power starts to be supplied to the backup RAM 74 again.

The interface 75 is connected to sensors 61 to 69 so as to send signals from these sensors to the CPU 71. In addition, the interface 75 is designed to send drive signals (instruction signals) to the actuator 33a of the variable intake timing controller 33, the actuator 36a of the variable exhaust timing controller 36, the igniter 38 of each of the cylinders, the fuel injection valve 39 provided for each of the cylinders, the throttle valve actuator 44a, etc. in response to instructions from the CPU 71.

The electric controller 70 is designed to send an instruction signal to the throttle valve actuator 44*a* so that the throttle valve opening TA increases as the obtained accelerator pedal operation amount Accp increases. That is, the electric controller 70 has throttle valve drive means for changing the opening of the "throttle valve 44 disposed in the intake passage of the engine 10" in accordance with the acceleration operation amount (accelerator pedal operation amount Accp) of the engine 10 which is changed by the driver.

(Principle of the Inter-cylinder Air-fuel Ratio Imbalance Determination)

Next, there will be described the principle of the "inter-cylinder air-fuel ratio imbalance determination" employed by the first determination apparatus. The inter-cylinder air-fuel ratio imbalance determination is a determination for determining whether or not a degree of the air-fuel ratio imbalance among cylinders becomes larger than a warning necessary value, due to a change in the characteristic of the fuel injection valve 39, and the like. In other words, the first determination apparatus determines whether or not the magnitude of the difference between the air-fuel ratio of the imbalanced cylinder and the air-fuel ratio of the balanced cylinder is larger than or equal to a "degree which can not be admissible in terms of the emission", and thus, an inadmissible imbalance among the cylinder-by-cylinder air-fuel ratios has been occurring, that is, whether or not the inter-cylinder air-fuel ratio imbalance state has been occurring.

The first determination apparatus, in order to perform (carry out) the inter-cylinder air-fuel ratio imbalance determination, obtains a "change amount per unit time (a constant sampling time ts)" of the "air-fuel ratio represented by the output value Vabyfs of the air-fuel ratio sensor 67 (i.e., the detected air-fuel ratio abyfs obtained by applying the output value Vabyfs to the air-fuel ratio conversion table Mapabyfs shown in FIG. 4)". This "change amount per unit time of the detected air-fuel ratio abyfs" can be referred to as a differential value d(abyfs)/dt with respect to time of the detected air-fuel ratio abyfs, when the unit time is an extremely short time such as 4 m seconds. Accordingly, the "change amount per unit time of the detected air-fuel ratio abyfs" is also referred to as a "detected air-fuel ratio changing rate ΔF."

Exhaust gases from the cylinders successively reach the air-fuel ratio sensor 67 in the order of ignition (accordingly, in the order of exhaust). In a case where no inter-cylinder air-fuel ratio imbalance state has been occurring, the air-fuel ratios of the exhaust gases, discharged from the cylinders and reaching the air-fuel ratio sensor 67, are approximately equal to one another. Accordingly, for example, in the case where no inter-cylinder air-fuel ratio imbalance state has been occurring, the detected air-fuel ratio abyfs varies as indicated by the broken line C1 shown in (B) of FIG. 5. That is, when the inter-cylinder air-fuel ratio imbalance state has not been occurring, a waveform of the output value Vabyfs of the air-fuel ratio sensor 67 is nearly flat. Therefore, as indicated by the broken line C3 in (C) of FIG. 5, when the inter-cylinder air-fuel ratio imbalance state has not been occurring, the absolute value of the detected air-fuel ratio changing rate ΔAF is small.

To the contrary, when a characteristic of the "fuel injection valve 39 for injecting the fuel to a specific cylinder (e.g., the first cylinder)" becomes a characteristic that the "injection valve injects a greater amount of the fuel compared to the instructed fuel injection amount," and consequently, when the inter-cylinder air-fuel ratio imbalance state (rich-side-deviated imbalance state) in which only the air-fuel ratio of the specific cylinder greatly deviates to the rich side from the stoichiometric air-fuel ratio has been occurring, a great difference is produced between the air-fuel ratio of the specific cylinder (the air-fuel ratio of the imbalanced cylinder) and the air-fuel ratios of the remaining cylinders (the air-fuel ratios of the balanced cylinders).

Figure 5:
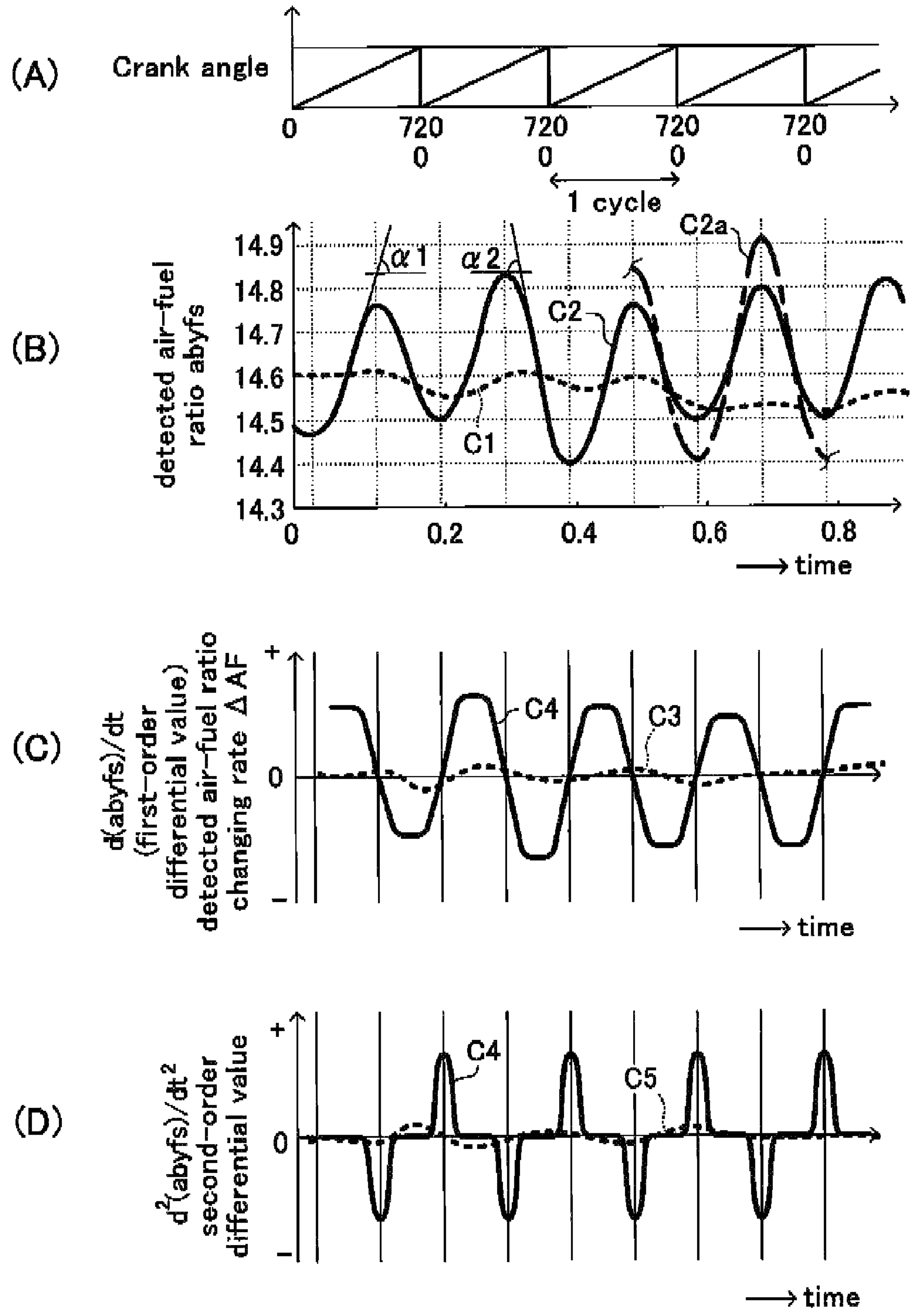
FIG. 5 is a time chart showing behaviors of values relating to imbalance determination parameters, when an inter-cylinder air-fuel ratio imbalance state has been occurring, and when the inter-cylinder air-fuel ratio imbalance state has not been occurring.

Accordingly, for example, as shown by the solid line C2 in (B) of FIG. 5, the detected air-fuel ratio abyfs when the rich-side-deviated imbalance state has been occurring varies/fluctuates greatly, every unit combustion cycle period (a period corresponding to a crank angle of 720° in the four cylinder, four cycle engine, that is a period corresponding to an elapse of a crank angle required for all of the cylinders (first to fourth cylinder), each of which discharges exhaust gas reaching the single air-fuel ratio sensor 67, to complete their single-time combustion strokes). Accordingly, the absolute value of the detected air-fuel ratio changing rate ΔAF is large when the inter-cylinder air-fuel ratio imbalance state is occurring, as shown by the solid line C4 in (C) of FIG. 5.

Further, the detected air-fuel ratio abyfs fluctuates/varies more greatly, as the air-fuel ratio of the imbalanced cylinder deviates more greatly from the air-fuel ratio of the balanced cylinder. For example, assuming that the detected air-fuel ratio abyfs varies as shown by the solid line C2 in (B) of FIG. 5 when the magnitude (absolute value) of the difference between the air-fuel ratio of the imbalanced cylinder and the air-fuel ratio of the balanced cylinder is a first value, the detected air-fuel ratio abyfs varies as shown by the alternate long and short dash line C2*a* in (B) of FIG. 5 when the magnitude (absolute value) of the difference between the air-fuel ratio of the imbalanced cylinder and the air-fuel ratio of the balanced cylinder is a "second value larger than the first value." Accordingly, the absolute value of the detected air-fuel ratio changing rate ΔAF becomes larger as the air-fuel ratio of the imbalanced cylinder deviates (differs) more greatly from the air-fuel ratio of the balanced cylinder.

In view of the above, the first determination apparatus obtains, as a base indicating amount, the detected air-fuel ratio changing rate ΔAF (first order differential value d(abyfs)/dt) every time the sampling time is passes (elapses) in a single unit combustion cycle period. The first determination apparatus obtains a mean (average) value of a plurality of the detected air-fuel ratio changing rates ΔAF obtained in the single unit combustion cycle period. Thereafter, the first determination apparatus obtains a mean (average) value of the "average value of the detected air-fuel ratio changing rates ΔAF", each of which has been obtained for each of a plurality of the unit combustion cycle periods, and adopts/employs, as the air-fuel ratio fluctuation indicating amount AFD as well as the imbalance determination parameter. It should be noted that the imbalance determination parameter is not limited to the value described above, but can be obtained using various ways described later.

Further, the first determination apparatus obtains, as an average air-fuel ratio AveABF, an average value of the detected air-fuel ratios abyfs in the unit combustion cycle period in which the air-fuel ratio fluctuation indicating amount AFD is obtained. Furthermore, the first determination apparatus obtains, as a parameter obtaining period average air-fuel ratio FinalAF, a mean (average) value of the average air-fuel ratios AveABF for a plurality of the unit combustion cycle periods in which the air-fuel ratio fluctuation indicating amount AFD is obtained. Thereafter, the first determination apparatus determines an imbalance determination threshold by applying the parameter obtaining period average air-fuel ratio FinalAF to a table MapXth(FinalAF) shown by the line L2 in FIG. 6.

According to the table MapXth(FinalAF), the imbalance determination threshold is determined in such a manner that the imbalance determination threshold becomes smaller as the parameter obtaining period average air-fuel ratio FinalAF is closer to the stoichiometric air-fuel ratio (e.g., 14.6) in the stoichiometric air-fuel ratio region. Further, according to the table MapXth(FinalAF), the imbalance determination threshold is determined in such a manner that the imbalance determination threshold becomes a constant value when the parameter obtaining period average air-fuel ratio FinalAF is in the rich region or in the lean region. Subsequently, the first determination apparatus compares the imbalance determination parameter with the imbalance determination threshold, and determines that inter-cylinder air-fuel ratio imbalance state has been occurring when the imbalance determination parameter is larger than the imbalance determination threshold.

(Actual Operation)

<Fuel Injection Amount Control>

Figure 11:
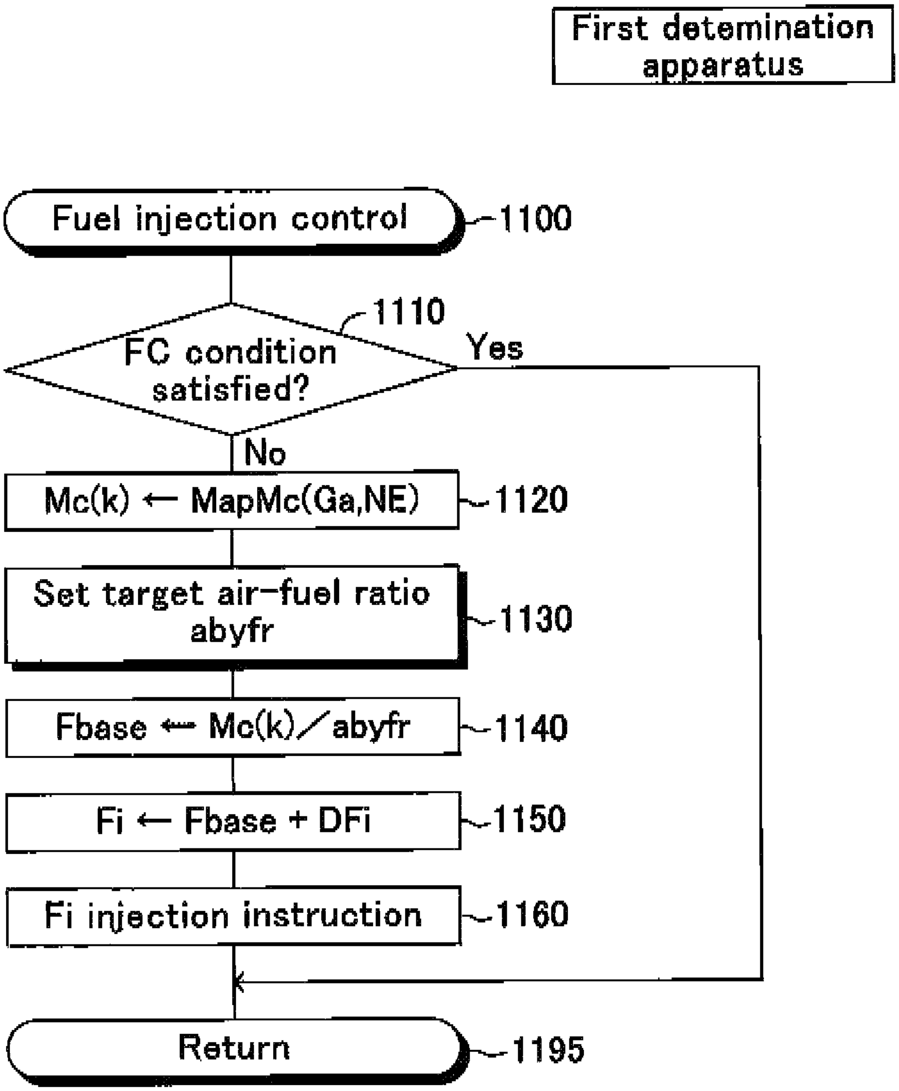
FIG. 11 is a flowchart showing a routine executed by the CPU of an inter-cylinder air-fuel ratio imbalance determination apparatus (first determination apparatus) according to a first embodiment of the present invention.

The CPU 71 of the first determination apparatus repeatedly executes a "routine to calculate an instructed fuel injection amount Fi and to instruct a fuel injection" shown in FIG. 11, every time a crank angle of any one of the cylinders reaches a predetermined crank angle before its intake top dead center (e.g., BTDC 90° CA), for that cylinder whose crank angle has reached the predetermined crank angle (hereinafter, referred to as a "fuel injection cylinder"). Accordingly, at an appropriate timing, the CPU 71 starts a process from step 1100, and proceeds to step 1110 to determine whether or not a fuel cut condition (hereinafter, expressed as a "FC condition") is satisfied.

Assuming that the FC condition is not satisfied, the CPU 71 executes processes from step 1120 to step 1160 described below one after another, and then proceeds to step 1195 to end the present routine tentatively.

Step 1120: The CPU 71 obtains an "in-cylinder intake air amount Mc(k)" which is an "air amount introduced into the fuel injection cylinder", on the basis of "the intake air flow rate Ga measured by the air-flow meter 61, the engine rotational speed NE obtained based on the signal from the crank position sensor 64, and a look-up table MapMc." The in-cylinder intake air amount Mc(k) is stored in the RAM, while being related to the intake stroke of each cylinder. The in-cylinder intake air amount Mc(k) may be calculated based on a well-known air model (a model constructed according to laws of physics describing and simulating a behavior of an air in the intake passage).

Step 1130: The CPU 71 sets a target upstream air-fuel ratio abyfr based on an operating state of the engine 10. In the first determination apparatus, the target upstream air-fuel ratio abyfr is set to (at) the stoichiometric air-fuel ratio stoich. It should be noted that the target upstream air-fuel ratio abyfr is set to an air-fuel ratio other than the stoichiometric air-fuel ratio at this step 1130 when a specific condition is satisfied.

Step 1140: The CPU 71 obtains a base fuel injection amount Fbase by dividing the in-cylinder intake air amount Mc(k) by the target upstream air-fuel ratio abyfr. Accordingly, the base fuel injection amount Fbase is a feedforward amount of the fuel injection amount required to realize/attain the target upstream air-fuel ratio abyfr.

Step 1150: The CPU 71 corrects the base fuel injection amount Fbase with a main feedback amount DFi. More specifically, the CPU 71 calculates the instructed fuel injection amount (a final fuel injection amount) Fi by adding the main feedback amount DFi to the base fuel injection amount Fbase. The main feedback amount DFi will be described later.

Step 1160: The CPU 71 makes the fuel injection valve 39 inject a fuel of the instructed fuel injection amount Fi, the fuel injection valve 39 being provided so as to correspond to the fuel injection cylinder.

Meanwhile, if the FC condition is satisfied when the CPU 71 executes the process of step 1110, the CPU 71 makes a "No" determination in step 1110, and directly proceeds to step 1195 to end the present routine temporarily. In this case, fuel cut control (fuel supply stop control) is performed because the fuel injection owing to the process of step 1160 is not performed.

<Calculation of the Main Feedback Amount>

Figure 12:
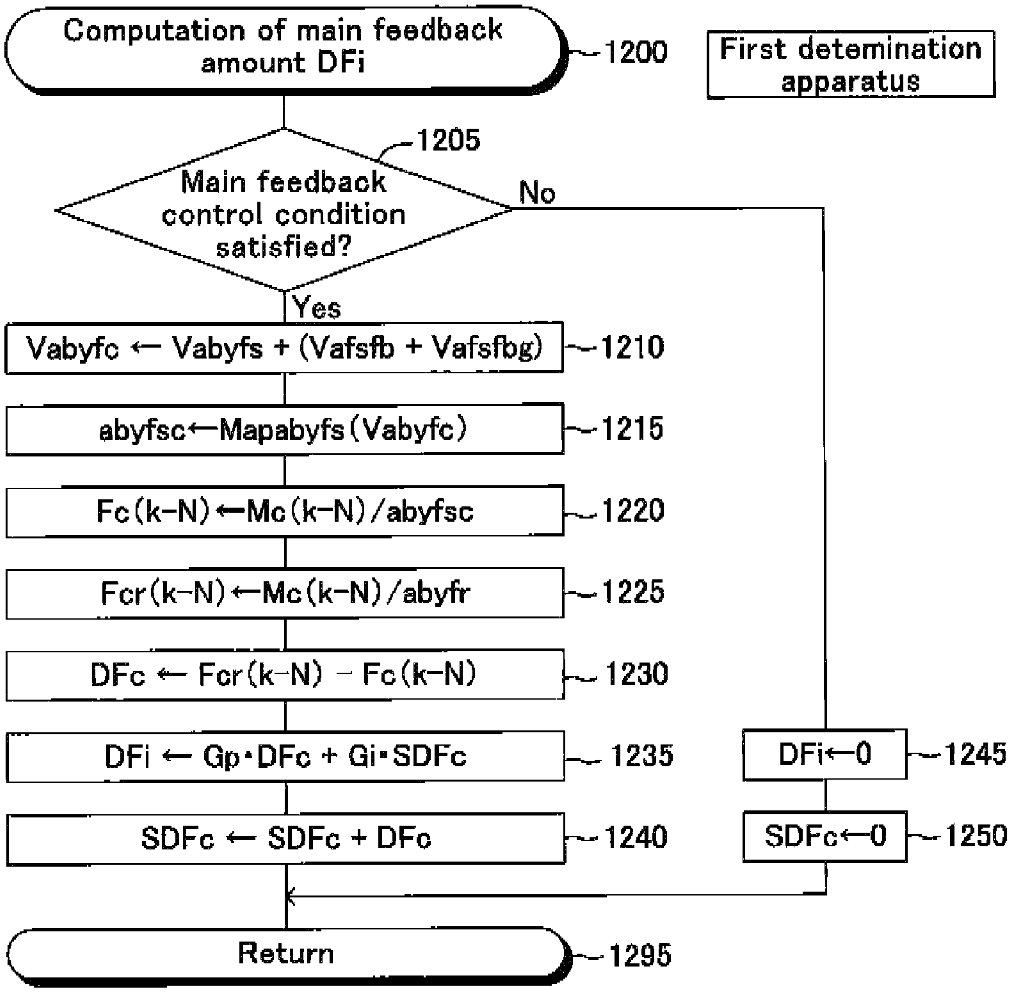
FIG. 12 is a flowchart showing another routine executed by the CPU of the first determination apparatus.

The CPU 71 repeatedly executes a "routine for the calculation of the main feedback amount" shown by a flowchart in FIG. 12, every time a predetermined time period elapses. Accordingly, at a predetermined timing, the CPU 71 starts the process from step 1200 to proceed to step 1205 at which CPU 71 determines whether or not a "main feedback control condition (an upstream air-fuel ratio feedback control condition)" is satisfied.

The main feedback control condition is satisfied when all of the following conditions are satisfied.

(A1) The air-fuel ratio sensor 67 has been activated.

(A2) The load (load rate) KL of the engine is smaller than or equal to a threshold value KLth.

(A3) The fuel cut control is not being performed.

It should be noted that the load rate KL is obtained based on the following formula (1). The accelerator pedal operation amount Accp can be used instead of the load rate KL. In the formula (1), Mc is the in-cylinder intake air amount, ρ is an air density (unit is (g/l), L is a displacement of the engine 10 (unit is (l)), and "4" is the number of cylinders of the engine 10.

$$KL=(Mc/(\rho\cdot L/4))\cdot 100\% \quad (1)$$

The description continues assuming that the main feedback control condition is satisfied. In this case, the CPU 71 makes a "Yes" determination at step 1205 to execute processes from step 1210 to step 1240 described below one after another, and then proceeds to step 1295 to end the present routine tentatively.

Step 1210: The CPU 71 obtains an output value Vabyfsc for a feedback control, according to a formula (2) described below. In the formula (2), Vabyfs is the output value of the air-fuel ratio sensor 67, and Vafsfb is a sub feedback amount calculated based on the output value Voxs of the downstream air-fuel ratio sensor 68. The way by which the sub feedback amount Vafsfb is calculated is well known. For example, the sub feedback amount Vafsfb is decreased when the output value Voxs of the downstream air-fuel ratio sensor 68 is a value representing a richer air-fuel ratio compared to the value Vst which corresponds to the stoichiometric air-fuel ratio, and is increased when the output value Voxs of the downstream air-fuel ratio sensor 68 is a value representing a leaner air-fuel ratio compared to the value Vst which corresponds to the stoichiometric air-fuel ratio. The first determination apparatus may set the sub feedback amount Vafsfb to (at) "0".

$$Vabyfc=Vabyfs+Vafsfb \quad (2)$$

Step 1215: The CPU 71 obtains an air-fuel ratio abyfsc for a feedback control by applying the output value Vabyfsc for a feedback control to the table Mapabyfs shown in FIG. 4, as shown by a formula (3) described below.

$$abyfsc=Mapabyfs(Vabyfsc) \quad (3)$$

Step 1220: According to a formula (4) described below, the CPU 71 obtains a "in-cylinder fuel supply amount Fc(k−N)"

which is an "amount of the fuel actually supplied to the combustion chamber 25 for a cycle at a timing N cycles before the present time." That is, the CPU 71 obtains the in-cylinder fuel supply amount Fc(k−N) through dividing the "in-cylinder intake air amount Mc(k−N) which is the in-cylinder intake air amount for the cycle the N cycles (i.e., N·720° crank angle) before the present time" by the "air-fuel ratio abyfsc for a feedback control."

$$Fc(k-N)=Mc(k-N)abyfsc \quad (4)$$

The reason why the cylinder intake air amount Mc(k−N) for the cycle N cycles before the present time is divided by the air-fuel ratio abyfsc for a feedback control in order to obtain the in-cylinder fuel supply amount Fc(k−N) is because the "exhaust gas generated by the combustion of the mixture in the combustion chamber 25" requires time "corresponding to the N cycles" to reach the air-fuel ratio sensor 67.

Step 1225: The CPU 71 obtains a "target in-cylinder fuel supply amount Fcr(k−N)" which is a "fuel amount supposed to be supplied to the combustion chamber 25 for the cycle the N cycles before the present time," according to a formula (5) described below. That is, the CPU 71 obtains the target in-cylinder fuel supply amount Fcr(k−N) by dividing the in-cylinder Intake air amount Mc(k−N) for the cycle the N cycles before the present time by the target upstream air-fuel ratio abyfr (=stoich).

$$Fcr(k-N)=Mc(k-N)/abyfr \quad (5)$$

Step 1230; The CPU 71 obtains an "error DFc of the in-cylinder fuel supply amount," according to a formula (6) described below. That is, the CPU 71 obtains the error DFc of the in-cylinder fuel supply amount by subtracting the in-cylinder fuel supply amount Fc(k−N) from the target cylinder fuel supply amount Fcr(k−N). The error DFc of the in-cylinder fuel supply amount represents excess and deficiency of the fuel supplied to the cylinder for the cycle the N cycles before the present time.

$$DFc=Fcr(k-N)-Fc(k-N) \quad (6)$$

Step 1235: The CPU 71 obtains the main feedback amount DFi, according to a formula (7) described below. In the formula (7) below, Gp is a predetermined proportion gain, and GI is a predetermined integration gain. Further, a "value SDF*c*" in the formula (7) is an "integrated value of the error DFc of the in-cylinder fuel supply amount." That is, the CPU 71 calculates the "main feedback amount DFi" based on a proportional-integral control to have the air-fuel ratio abyfsc for a feedback control coincide with the target upstream air-fuel ratio abyfr.

$$DFi=Gp\cdot DFc+Gi\cdot SDFc \quad (7)$$

Step 1240: The CPU 71 obtains a new integrated value SDFc of the error DFc of the in-cylinder fuel supply amount by adding the error DFc of the in-cylinder fuel supply amount obtained at step 1230 described above to the current/present integrated value SDFc of the error DFc of the in-cylinder fuel supply amount.

As described above, the main feedback amount DFi is obtained based on the proportional-integral control. The main feedback amount DFi is reflected in (onto) the instructed fuel injection amount Fi by the process of step 1150 shown in FIG. 11.

To the contrary, if the main feedback control condition is unsatisfied at the time of determination at the step 1205 shown in FIG. 12, the CPU 71 makes a "No" determination to proceed to step 1245 to set the value of the main feedback amount DFi to (at) "0" Subsequently, the CPU 71 stores "0" into the integrated value SDFc of the error of the in-cylinder fuel supply amount at step 1250. Thereafter, the CPU 71 proceeds to step 1295 to end the present routine tentatively.

As described above, when the main feedback control condition is not satisfied, the main feedback amount DFi is set to (at) "0," Accordingly, the correction for the base fuel injection amount Fbase with the main feedback amount DFi is not performed.

<Inter-cylinder Air-fuel Ratio Imbalance Determination>

Next will be described processes for performing the "inter-cylinder air-fuel ratio imbalance determination." The CPU 71 is configured in such a manner that it executes a "routine for inter-cylinder air-fuel ratio imbalance determination" shown by a flowchart in FIG. 13 every elapse of 4 ms (a predetermined constant sampling time ts).

Accordingly, at an appropriate timing, the CPU 71 starts process from step 1300 to proceed to step 1305, at which the CPU 71 determines whether or not a value of a determination permission flag Xkyoka is "1."

The value of the determination permission flag Xkyoka is set to (at) "1," if a determination execution condition is satisfied when the absolute crank angle CA coincides with 0° crank angle. The value of the determination permission flag Xkyoka is set to (at) "0" immediately after the determination execution condition becomes unsatisfied.

The determination execution condition is satisfied when all of conditions (conditions C0 to C3) described below are satisfied. In other words, the determination execution condition is not satisfied when at least any one of the following conditions (conditions C0 to C3) is unsatisfied, (Condition C0)

The inter-cylinder air-fuel ratio imbalance determination has not been carried out yet after the current start of the engine 10. The condition C0 is also referred to as an imbalance determination execution requirement condition. The condition C0 may be replaced with a condition that either one of "an accumulated operation time of the engine 10 and an integrated value of the intake air flow rate Ga" after a previous imbalance determination is larger than or equal to a predetermined value.

(Condition C1)

A state in which the intake air flow rate Ga obtained from the air flow meter 61 is larger than a first threshold intake air flow rate Ga1th has continued for a first threshold time T1th or longer. In other words, the intake air flow rate Ga is larger than the first threshold intake air flow rate Ga1th, and an elapsed time is equal to or longer than the first threshold time T1th since a point in time at which the intake air flow rate Ga changed from a value smaller than the first threshold intake air flow rate Ga1th to a value larger than the first threshold intake air flow rate Ga1th.

(Condition C2)

The main feedback control condition is satisfied.

(Condition C3)

The fuel cut control is not being performed.

Here, it is assumed that the value of the determination permission flag Xkyoka is "1." In this case, the CPU 71 makes a "Yes" determination at step 1305 to proceed to step 1310, at which the CPU 71 obtains the "output value Vabyfs of the air-fuel ratio sensor 67 at that time" by an A/D conversion.

Subsequently, the CPU 71 proceeds to step 1315 to obtain a present (current) detected air-fuel ratio abyfs by applying the output value Vabyfs obtained at step 1310 to the air-fuel ratio conversion table Mapabyfs shown in FIG. 4. It should be noted that the CPU 71 stores the detected air-fuel ratio abyfs which was obtained in the previous execution of the present routine as a previous detected air-fuel ratio abyfsold, before executing the process of the step 1315. That is, the previous detected air-fuel ratio abyfsold is the detected air-fuel ratio abyfs 4 ms (the sampling time ts) before the present time. An initial value of the previous detected air-fuel ratio abyfsold is set at a value obtained by AD conversion of the stoichiometric air-fuel ratio corresponding value Vstoich. The initial routine is a routine executed by the CPU 71 when the ignition key switch of the vehicle on which the engine 10 is mounted is turned on from off.

Subsequently, the CPU 71 proceeds to step 1320, at which the CPU 71, (A) obtains the detected air-fuel ratio changing rate ΔAF, (B) renews a cumulated value SAFD of an absolute value |ΔAF| of the detected air-fuel ratio changing rate ΔAF, (C) renews a cumulated value SABF for calculating the average air-fuel ratio, and (D) renews a cumulated number counter Cn showing how many times the absolute value |ΔAF| of the detected air-fuel ratio changing rate ΔAF is accumulated (integrated) to the cumulated value SAFD.

Next will be described the ways in which these values are renewed specifically.

(A) Obtainment of the detected air-fuel ratio changing rate ΔAF: The detected air-fuel ratio changing rate ΔAF is a base data (a base indicating amount) for the imbalance determination parameter. The CPU 71 obtains the detected air-fuel ratio changing rate ΔAF by subtracting the previous detected air-fuel ratio abyfsold from the present detected air-fuel ratio abyfs. That is, when the present detected air-fuel ratio abyfs is expressed as abyfs(n) and the previous detected air-fuel ratio abyfs is expressed as abyfs(n−1), the CPU 71 obtains the "present detected air-fuel ratio changing rate ΔAF(n)" at step 1320 according to a formula (8) described below.

$$\Delta AF(n)=abyfs(n)-abyfs(n-1) \quad (8)$$

(B) Renewal of the cumulated value SAFD of the absolute value |ΔAF| of the detected air-fuel ratio changing rate ΔAF:

The CPU 71 obtains the present cumulated value SAFD(n) according to a formula (9) described below. That is, the CPU 71 updates the cumulated value SAFD by adding the present absolute value |ΔAF(n)| of the detected air-fuel ratio changing rate ΔAF(n) obtained as described above to the previous cumulated value SAFD(n−1) when the CPU 71 proceeds to step 1320.

$$SAFD(n)=SAFD(n-1)+|\Delta AF(n)| \quad (9)$$

The reason why the "absolute value |ΔAF(n)| of the detected air-fuel ratio changing rate" is added to the cumulated value SAFD is that the detected air-fuel ratio changing rate ΔAF(n) can become both a positive value and a negative value, as understood from (B) and (C) in FIG. 5. It should be noted that the cumulated value SAFD is set to (at) "0" in the initial routine.

(C) Renewal of the cumulated value SABF for calculating the average air-fuel ratio:

The CPU 71 obtains the present cumulated value SABF(n) for calculating the average air-fuel ratio according to a formula (10) described below. That is, the CPU 71 updates the cumulated value SABF by adding the present detected air-fuel ratio abyfs(n) obtained at the step 1315 described above to the previous cumulated value SABF(n−1) for calculating the average air-fuel ratio when the CPU 71 proceeds to step 1320.

$$SABF(n)=SABF(n-1)+abyfs(n) \quad (10)$$

(D) Renewal of the cumulated number counter On showing how many times the absolute value |ΔAF| of the detected air-fuel ratio changing rate ΔAF is accumulated to the cumulated value SAFD:

The CPU 71 increments a value of the counter Cn by "1" according to a formula (11) described below. Cn(n) represents the counter Cn after the renewal, and Cn(n−1) represents the counter Cn before the renewal. The value of the counter Cn is set at "0" in the initial routine described above, and is also set to (at) "0" at step 1375 described later. The value of the counter Cn therefore represents the number of data of the absolute value |ΔAF| of the detected air-fuel ratio changing rate ΔAF which has been accumulated in the cumulated value SAFED, and the number of data of the detected air-fuel ratio abyfs which has been accumulated in the cumulated value SABF for calculating the average air-fuel ratio.

$$Cn(n)=Cn(n-1)+1 \quad (11)$$

Subsequently, the CPU 71 proceeds to step 1325 to determine whether or not the crank angle CA (the absolute crank angle CA) measured with reference to a top dead center of a compression stroke of a reference cylinder (in the present example, the first cylinder) reaches 720° crank angle. When the absolute crank angle CA is less than 720° crank angle, the CPU 71 makes a "No" determination at step 1325 to directly proceed to step 1395, at which the CPU 71 ends the present routine tentatively.

It should be noted that step 1325 is a step to define the smallest unit period (the unit combustion cycle period) for obtaining a mean (or average) value of the absolute value |ΔAF| of the detected air-fuel ratio changing rate ΔAF. Here, the 720° crank angle corresponds to the smallest unit period. The smallest unit period may obviously be shorter than the 720° crank angle, however, may preferably be a time period longer than or equal to a period having an integral multiple of the sampling time, ts. That is, it is preferable that the smallest unit period be determined in such a manner that a plurality of the detected air-fuel ratio changing rates ΔAFs are obtained in the smallest unit period.

Meanwhile, if the absolute crank angle CA reaches 720° crank angle when the CPU 71 executes the process of step 1325, the CPU 71 makes a "Yes" determination at step 1325 to proceed to step 1330.

The CPU 71, at step 1330:

(E) calculates an average value AveΔAF of the absolute values |ΔAF| of the detected air-fuel ratio changing rates ΔAF, (F) renews cumulated value Save of the average value AveΔAF, (G) calculates an average air-fuel ratio AveABF, (H) renews a cumulated value SAveABF of the average air-fuel ratio AveABF, and (I) renews a cumulated number counter Cs.

Next will be described the ways in which these values are renewed specifically.

(E) Calculation of the average value AveΔAF of the absolute values |ΔAF| of the detected air-fuel ratio changing rates ΔAF:

The CPU 71 calculates the average value AveΔAF (=SAFD/Cn) of the absolute values |ΔAF| of the detected air-fuel ratio changing rates ΔAF by dividing the cumulated value SAFD by a value of the counter Cn. Thereafter, the CPU 71 sets the cumulated value SAFE to (at) "0."

(F) Renewal of the cumulated value Save of the average value AveΔAF:

The CPU 71 obtains the present cumulated value Save(n) according to a formula (12) described below. That is, the CPU 71 renews the cumulated value Save by adding the present average value AveΔAF obtained as described above to the previous cumulated value Save(n−1) when the CPU 71 proceeds to step 1330. A value of the cumulated value Save is set to (at) "0" in the initial routine described above.

$$Save(n)=Save(n-1)+Ave\Delta AF \quad (12)$$

(G) Renewal of the average air-fuel ratio AveABF:

The CPU 71 calculates the average air-fuel ratio AveABF (=SABF/Cn) through dividing the cumulated value SABF for calculating the average air-fuel ratio by the value of the counter Cn. Thereafter, the CPU 71 sets the cumulated value SABF to (at) "0."

(H) Renewal of the cumulated value SAveABF of the average air-fuel ratio AveABF:

The CPU 71 obtains the present cumulated value SAveABF(n) according to a formula (13) described below. That is, the CPU 71 renews the cumulated value SAveABF by adding the average air-fuel ratio AveABF calculated as described above to the previous cumulated value SAveABF(n−1) when the CPU 71 proceeds to step 1330. A value of the cumulated value SAveABF is set to (at) "0" in the initial routine described above.

$$SAveABF(n)=SAveABF(n-1)+AveABF \quad (13)$$

(I) Renewal of the cumulated number counter Cs:

The CPU 71 increments a value of the counter Cs by "1" according the renewal, and Cs(n−1) represents the counter Cs before the renewal. The value of the counter Cs is set to (at) "0" in the initial routine described above. The value of the counter Cs therefore represents the number of data of the average value AveΔAF which has been accumulated in the cumulated value Save as well as the number of data of the average air-fuel ratio AveABF which has been accumulated in the cumulated value SAveABF.

$$Cs(n)=Cs(n-1)+1 \quad (14)$$

Subsequently, the CPU 71 proceeds to step 1335 to determine whether or not the value of the counter Cs is larger than or equal to a threshold value Csth. When the value of the counter Cs is less than the threshold value Csth, the CPU 71 makes a "No" determination at step 1335 to directly proceed to step 1395, at which the CPU 71 ends the present routine tentatively. It, should be noted that the threshold value Csth is a natural number, and is preferably larger than or equal to 2.

Meanwhile, if the value of the counter Cs is larger than or equal to the threshold value Csth when the CPU 71 executes the process of step 1335, the CPU 71 makes a "Yes" determination at step 1335 to execute processes from step 1340 to step 1355 one after another, and then proceeds to step 1360.

Step 1340: The CPU 71 obtains the air-fuel ratio fluctuation indicating amount AFD through dividing the cumulated value Save by a value of the counter CS (=Csth) according to a formula (15) described below. The air-fuel ratio fluctuation indicating amount AFD is a value obtained by averaging the average values of the absolute values |ΔAF| of the detected air-fuel ratio changing rates ΔAF, each of which has been obtained for each of the unit combustion cycle periods, for/over a plurality (Csth) of unit combustion cycle periods.

$$AFD=Save/Csth \quad (15)$$

Step 1345: The CPU 71 calculates a parameter obtaining period average air-fuel ratio FinalAF through dividing the cumulated value SAveABF of the average air-fuel ratio AveABF by the value of the counter Cs (=Csth) according to a formula (16) described below. The parameter obtaining period average air-fuel ratio is an average value of the "air-fuel ratio of the exhaust gas passing/flowing through the position where the air-fuel ratio sensor 67 is disposed" in a period for which the air-fuel ratio fluctuation indicating amount AFD has been obtaining.

$$FinalAF=SAveABF/Csth \quad (16)$$

Step 1350: The CPU 71 determines the Imbalance determination threshold Xth by applying the parameter obtaining period average air-fuel ratio FinalAF calculated at step 1345 to the table MapXth(FinalAF) shown by the line L2 in FIG. 6. As described above, according to the table MapXth(FinalAF), the imbalance determination threshold Xth becomes smaller as the parameter obtaining period average air-fuel ratio FinalAF is closer to the stoichiometric air-fuel ratio (e.g., 14.6).

It should be noted that the imbalance determination threshold Xth may be further corrected based on the intake air flow rate Ga in such a manner that the imbalance determination threshold Xth becomes larger as the intake air flow rate Ga becomes larger.

Step 1355: The CPU 71 adopts/employs (stores) the air-fuel ratio fluctuation indicating amount AFD as the imbalance determination parameter X. That is, in the present example, the imbalance determination parameter is obtained without correcting the air-fuel ratio fluctuation indicating amount AFD.

The CPU 71 proceeds to step 1360 after step 1355, and determines whether or not the imbalance determination parameter is larger than the imbalance determination parameter Xth.

When the imbalance determination parameter X is larger than the imbalance determination parameter Xth, the CPU 71 makes a "Yes" determination at step 1360 to proceed to step 1365, at which the CPU 71 sets a value of an imbalance occurrence flag XINB to (at) "1," That is, the CPU 71 determines that the inter-cylinder air-fuel ratio imbalance state has been occurring. Further, at this time, the CPU 71 may turn on a warning light which is not shown. It should be noted that the value of the imbalance occurrence flag XINB is stored in the Backup RAM 74. Thereafter, the CPU 71 proceeds to step 1395 to end the present routine tentatively.

In contrast, if the imbalance determination parameter X is smaller than or equal to the imbalance determination parameter Xth when the CPU 71 executes the process of step 1360, the CPU 71 makes a "No" determination at step 1360 to proceed to step 1370, at which the CPU 71 sets the value of the imbalance occurrence flag XINB to (at) "2." That is, the CPU 71 stores the fact that the "determination that the inter-cylinder air-fuel ratio imbalance state has not been occurring is made as a result of the inter-cylinder air-fuel ratio imbalance determination." Thereafter, the CPU 71 proceeds to step 1395 to end the present routine tentatively. It should be noted that the step 1370 may be omitted.

Meanwhile, if the value of the determination permission flag Xkyoka is not "1" when the CPU 71 proceeds to step 1305, the CPU 71 makes a "No" determination at step 1305 to proceed to step 1375. Then, the CPU 71 sets (or clears) each of the values (e.g., ΔAF, SAFD, SABF, Cn, and so on) to (at) "0" at step 1375. Subsequently, the CPU 71 directly proceeds to step 1395 to end the present routine tentatively.

As described above, the first determination apparatus is applied to the multi-cylinder engine 10 having a plurality of the cylinders.

Figure 13:
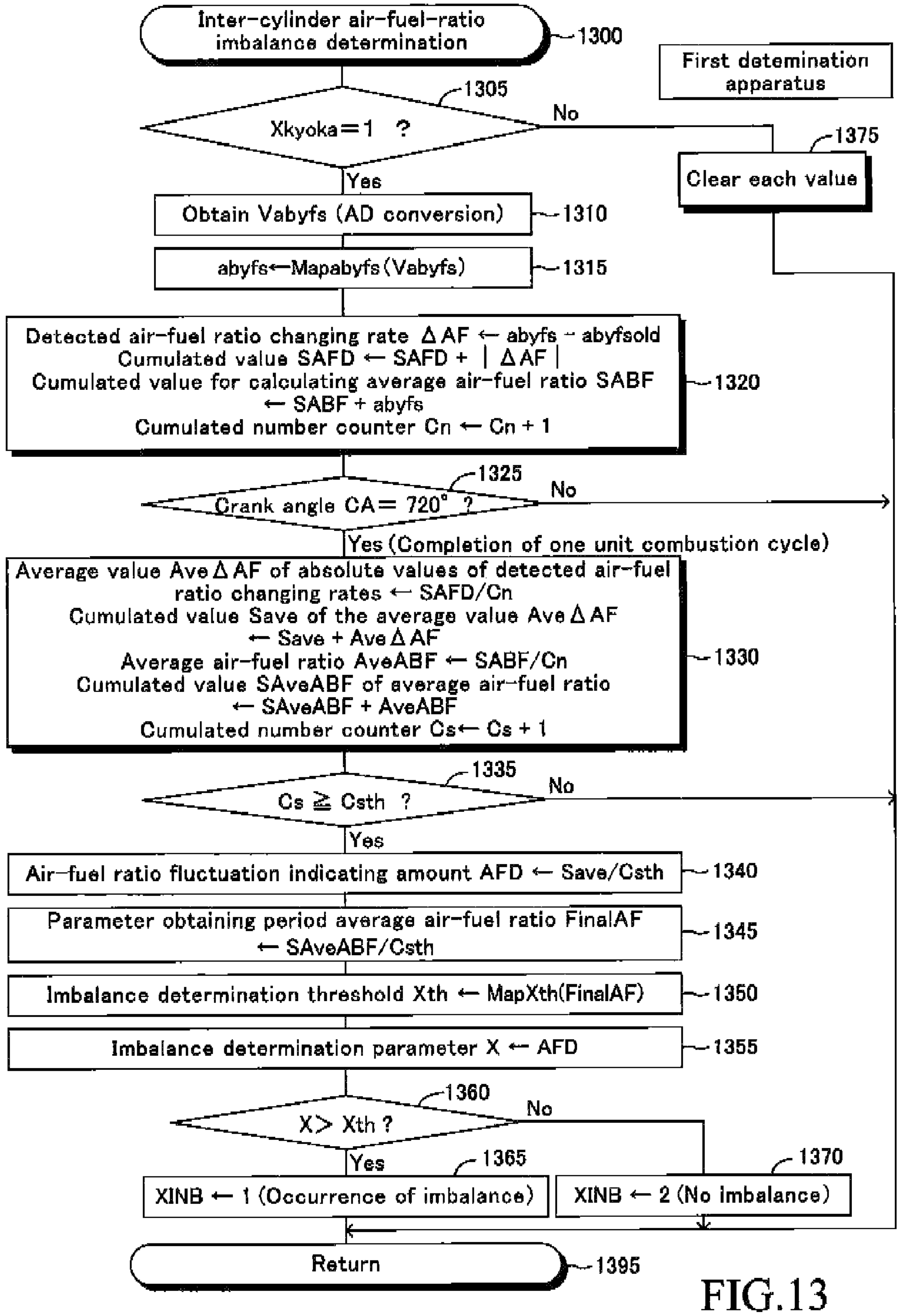
FIG. 13 is a flowchart showing another routine executed by the CPU of the first determination apparatus.

Further, the first determination apparatus comprises: air-fuel ratio fluctuation indicating amount obtaining means for obtaining, based on the output value Vabyfs of the air-fuel ratio sensor 67, the air-fuel ratio fluctuation indicating amount AFD whose absolute value becomes larger as (the magnitude of) the fluctuation of the air-fuel ratio of the exhaust gas passing/flowing through the position where the air-fuel ratio sensor 67 is disposed becomes larger (step 1310 to step 1340, shown in FIG. 13); and Imbalance determining means for comparing the imbalance determination parameter X which becomes larger as the absolute value of the obtained air-fuel ratio fluctuation indicating amount AFD becomes larger with the predetermined imbalance determination threshold Xth, and determining that the inter-cylinder air-fuel ratio imbalance state has been occurring when the imbalance determination parameter X is larger than the imbalance determination threshold Xth (step 1355 to step 1370, shown in FIG. 13).

Figure 6:
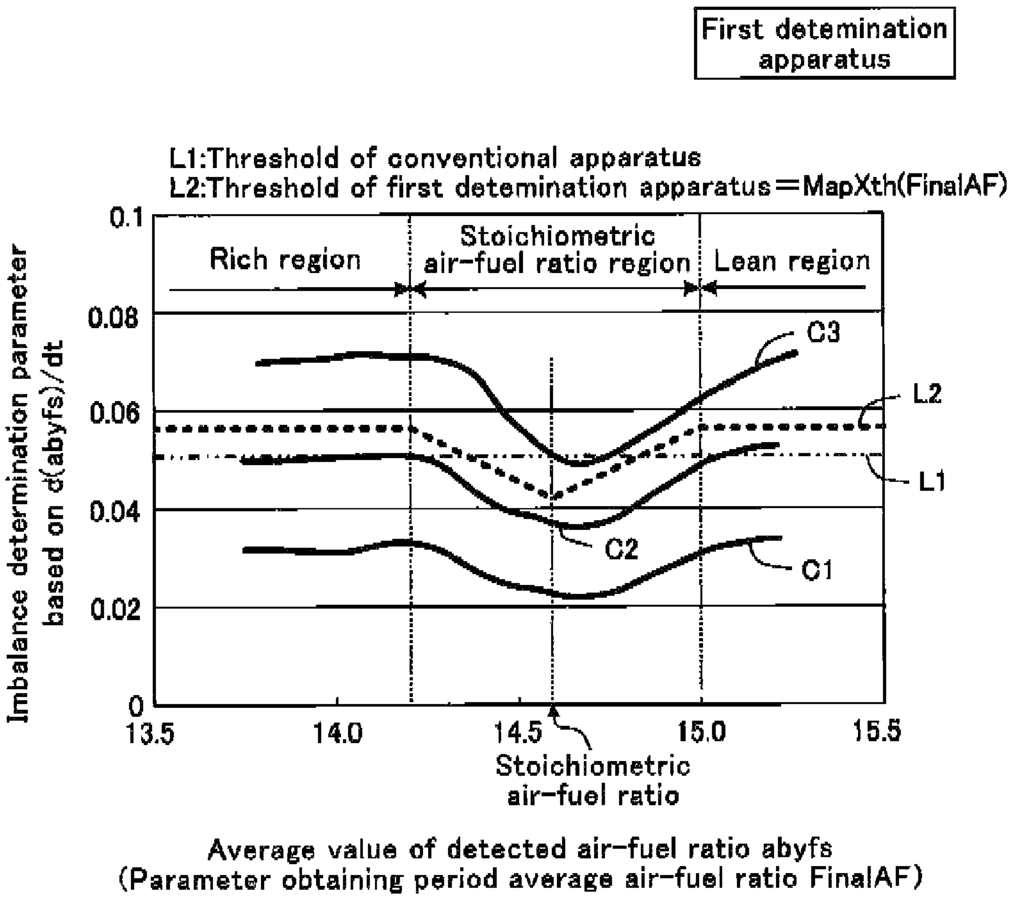
FIG. 6 is a graph showing a relation between a parameter obtaining period average air-fuel ratio and an imbalance determination parameter.

Further, the imbalance determining means includes threshold determining means for obtaining, based on the output value Vabyfs of the air-fuel ratio sensor 67, the "parameter obtaining period average air-fuel ratio FinalAF" which is the average value of the air-fuel ratio of the exhaust gas passing through the position where the air-fuel ratio sensor 67 is disposed while the air-fuel ratio fluctuation indicating amount AFD is being obtained (step 1320, step 1330, step 1345, and so on, in HG. 13), and for determining, based on the parameter obtaining period average air-fuel ratio FinalAF, the imbalance determination threshold Xth in such a manner that the imbalance determination threshold Xth becomes smaller as the parameter obtaining period average air-fuel ratio FinalAF is closer to the stoichiometric air-fuel ratio (refer to step 1350 shown in FIG. 13 and the broken line L2 shown in FIG. 6).

As described above, the air-fuel ratio fluctuation indicating amount AFD and the imbalance determination parameter varying depending on the the air-fuel ratio fluctuation indicating amount AFD is small when the parameter obtaining period average air-fuel ratio FinalAF is close to the stoichiometric air-fuel ratio, compared to the case where the parameter obtaining period average air-fuel ratio FinalAF is away from the stoichiometric air-fuel ratio.

To cope with this fact, the threshold determining means of the first determination apparatus determines the imbalance determination threshold Xth in such a manner that the imbalance determination threshold Xth becomes smaller as the parameter obtaining period average air-fuel ratio FinalAF is closer to the stoichiometric air-fuel ratio. Consequently, the apparatus can determine whether or not the inter-cylinder air-fuel ratio imbalance state has been occurring with high accuracy.

Second Embodiment

Next, there will be described a determination apparatus according to a second embodiment of the present invention (hereinafter simply referred to as a "second determination apparatus").

The second determination apparatus, similarly to the first determination apparatus, determines the imbalance determination threshold Xth based on the parameter obtaining period average air-fuel ratio FinalAF. Further, the second determination apparatus corrects the air-fuel ratio fluctuation indicating amount AFD based on the parameter obtaining period average air-fuel ratio FinalAF in such a manner that air-fuel ratio fluctuation indicating amount AFD is made larger as the parameter obtaining period average air-fuel ratio FinalAF is closer to the stoichiometric air-fuel ratio, and adopts/employs the corrected value as the imbalance determination parameter X. The second determination apparatus is the same as the first determination apparatus in the points other than the above described point.

(Actual Operation)

Figure 14:
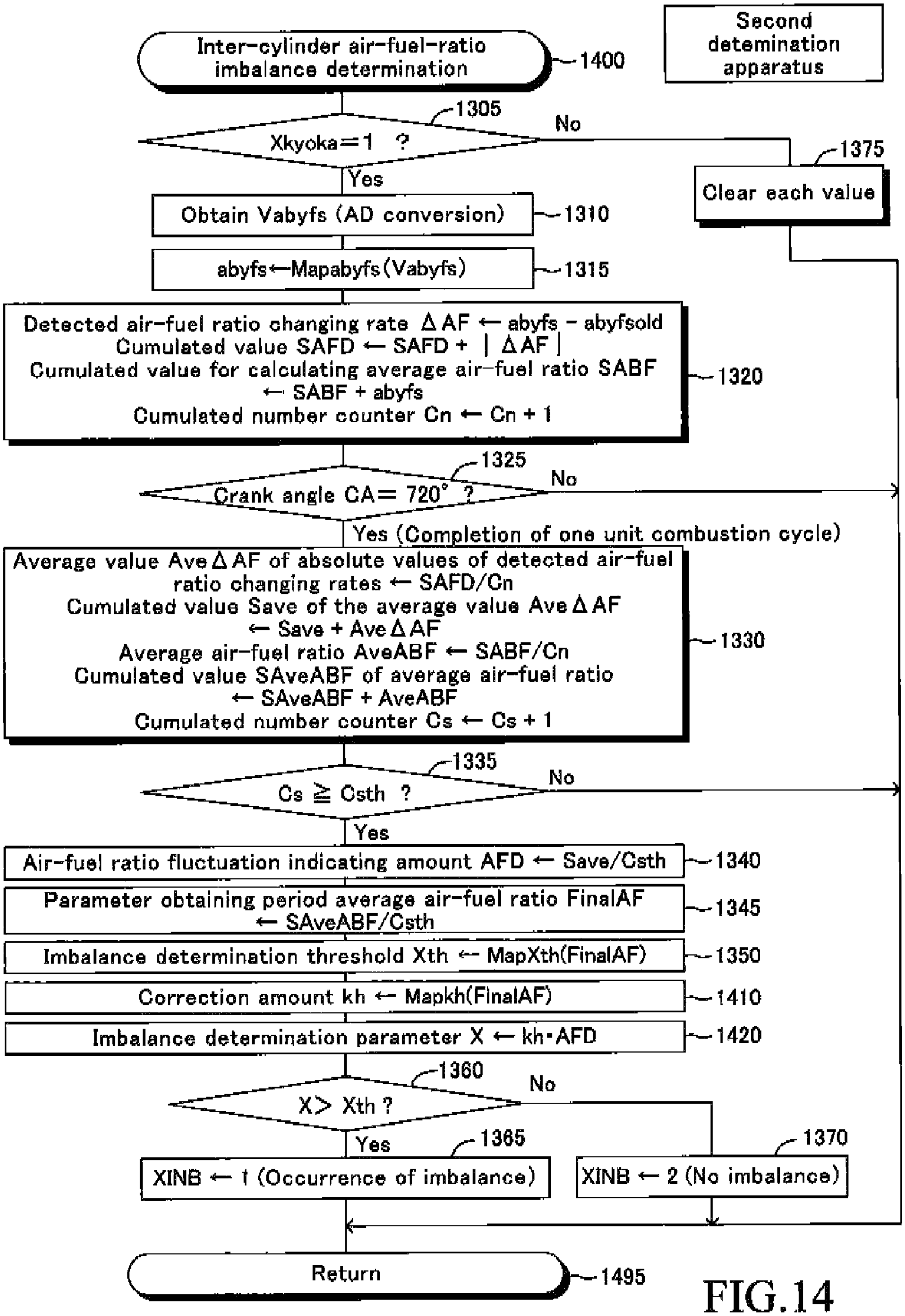
FIG. 14 is a flowchart showing a routine executed by the CPU of an inter-cylinder air-fuel ratio imbalance determination apparatus (second determination apparatus) according to a second embodiment of the present invention.

The CPU 71 of the second determination apparatus differs from the first determination apparatus only in that the CPU 71 executes a "routine for the inter-cylinder air-fuel ratio imbalance determination" shown in FIG. 14 in place of FIG. 13 every elapse of the sampling time is (4 ms). Accordingly, this difference will be mainly described hereinafter.

The routine shown in FIG. 14 is different from the routine shown in FIG. 13 only in that step 1355 in the routine shown in FIG. 13 is replaced with "step 1410 and step 1420." Thus, processes of step 1410 and step 1420 will be described, hereinafter. It should be noted that each step at which the same process is performed as each step which has been already described is given the same numeral as one given to such step.

Figure 15:
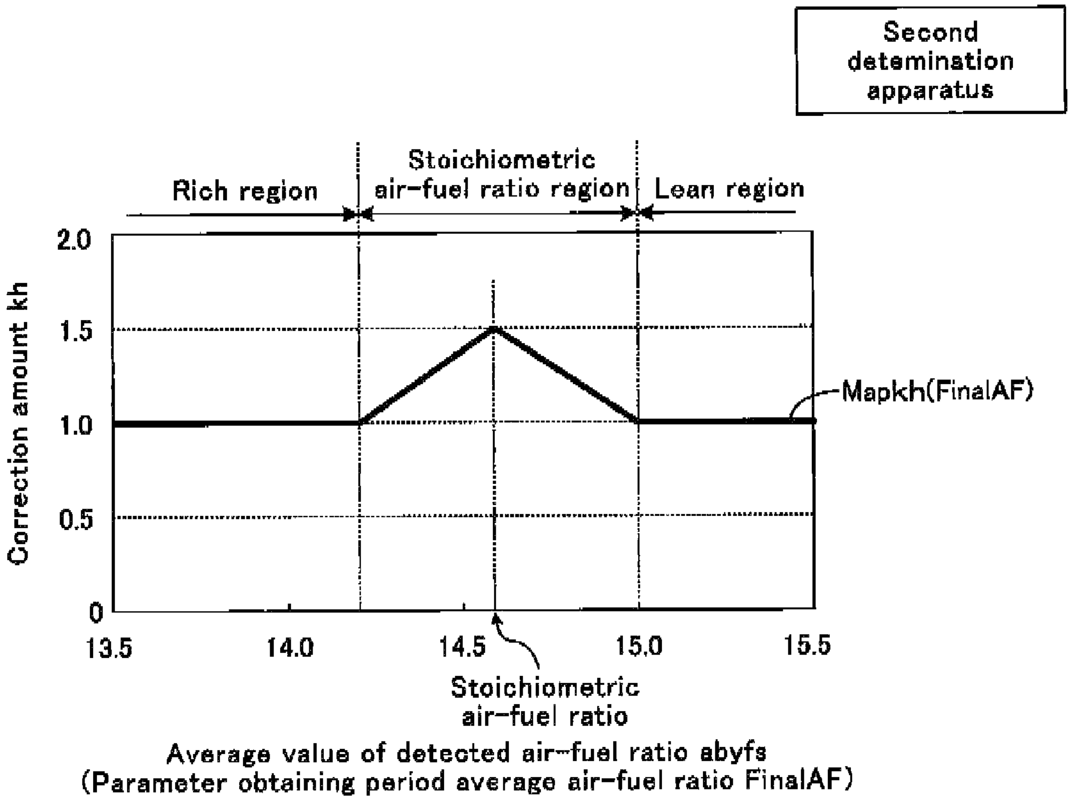
FIG. 15 is a table to which the CPU of the second determination apparatus refers when it determines a correction amount for an air-fuel ratio fluctuation indicating amount.

The CPU 71 proceeds step 1410 after it finishes the process of step 1350. The CPU 71 determines a correction value kh (kh>1.0) at step 1410, by applying the parameter obtaining period average air-fuel ratio FinalAF calculated at step 1345 to a correction calculation table Mapkh(FinalAF) shown in FIG. 15. According to the table Mapkh(FinalAF), the correction coefficient kh is obtained in such a manner that the correction value kh becomes larger in a range larger than or equal to 1.0 as the parameter obtaining period average air-fuel ratio FinalAF is closer to the stoichiometric air-fuel ratio (e.g., 14.6). Further, according to the table Mapkh(FinalAF), the correction value kh is maintained at 1.0, when the parameter obtaining period average air-fuel ratio FinalAF is in the rich region or in the lean region.

Subsequently, the CPU 71 proceeds to step 1420 to obtain (determine) a value (kh·AFD) obtained by multiplying the air-fuel ratio fluctuation indicating amount AFD obtained at step 1340 by the correction coefficient kh, as the imbalance determination parameter X. Thereafter, the CPU 71 proceeds to steps from step 1360 to perform the imbalance determination based on the comparison between the imbalance determination parameter X and the imbalance determination threshold Xth, similarly to the first determination apparatus.

As described above, the imbalance determining means of the second determination apparatus includes "threshold determining means for determining the imbalance determination threshold Xth based on the parameter obtaining period average air-fuel ratio FinalAF", similarly to the first determination apparatus. Further, the imbalance determining means of the second determination apparatus also includes imbalance determination parameter obtaining means for obtaining (determining), as the imbalance determination parameter X, the "value obtained by correcting the air-fuel ratio fluctuation indicating amount AFD based on the parameter obtaining period average air-fuel ratio FinalAF" in such a manner that the air-fuel ratio fluctuation indicating amount AFD becomes larger as the parameter obtaining period average air-fuel ratio FinalAF is closer to the stoichiometric air-fuel ratio (step 1410 and step 1420, shown in FIG. 14).

According to this configuration, it is possible to reduce a difference between the imbalance determination parameter X obtained when the parameter obtaining period average air-fuel ratio FinalAF is a value greatly deviating (away) from the stoichiometric air-fuel ratio and the imbalance determination parameter X obtained when the parameter obtaining period average air-fuel ratio FinalAF is very close to the stoichiometric air-fuel ratio, while the cylinder-by-cylinder air-fuel ratio difference is constant.

Accordingly, the imbalance determination can be made accurately without greatly changing the imbalance determination threshold.

Third Embodiment

Next, there will be described a determination apparatus according to a third embodiment of the present invention (hereinafter simply referred to as a "third determination apparatus").

The third determination apparatus determines the imbalance determination threshold Xth based on the intake air flow rate Ga. However, the third determination apparatus does not change the imbalance determination threshold Xth in accordance with the parameter obtaining period average air-fuel ratio FinalAF. Further, the third determination apparatus, similarly to the second determination apparatus, corrects the air-fuel ratio fluctuation indicating amount AFD based on the parameter obtaining period average air-fuel ratio FinalAF in such a manner that the air-fuel ratio fluctuation indicating amount AFD becomes larger as the parameter obtaining period average air-fuel ratio FinalAF is closer to the stoichiometric air-fuel ratio, and adopts/employs the corrected value as the imbalance determination parameter X. The third determination apparatus is the same as the second determination apparatus in the points other than the above described point.

(Actual Operation)

Figure 16:
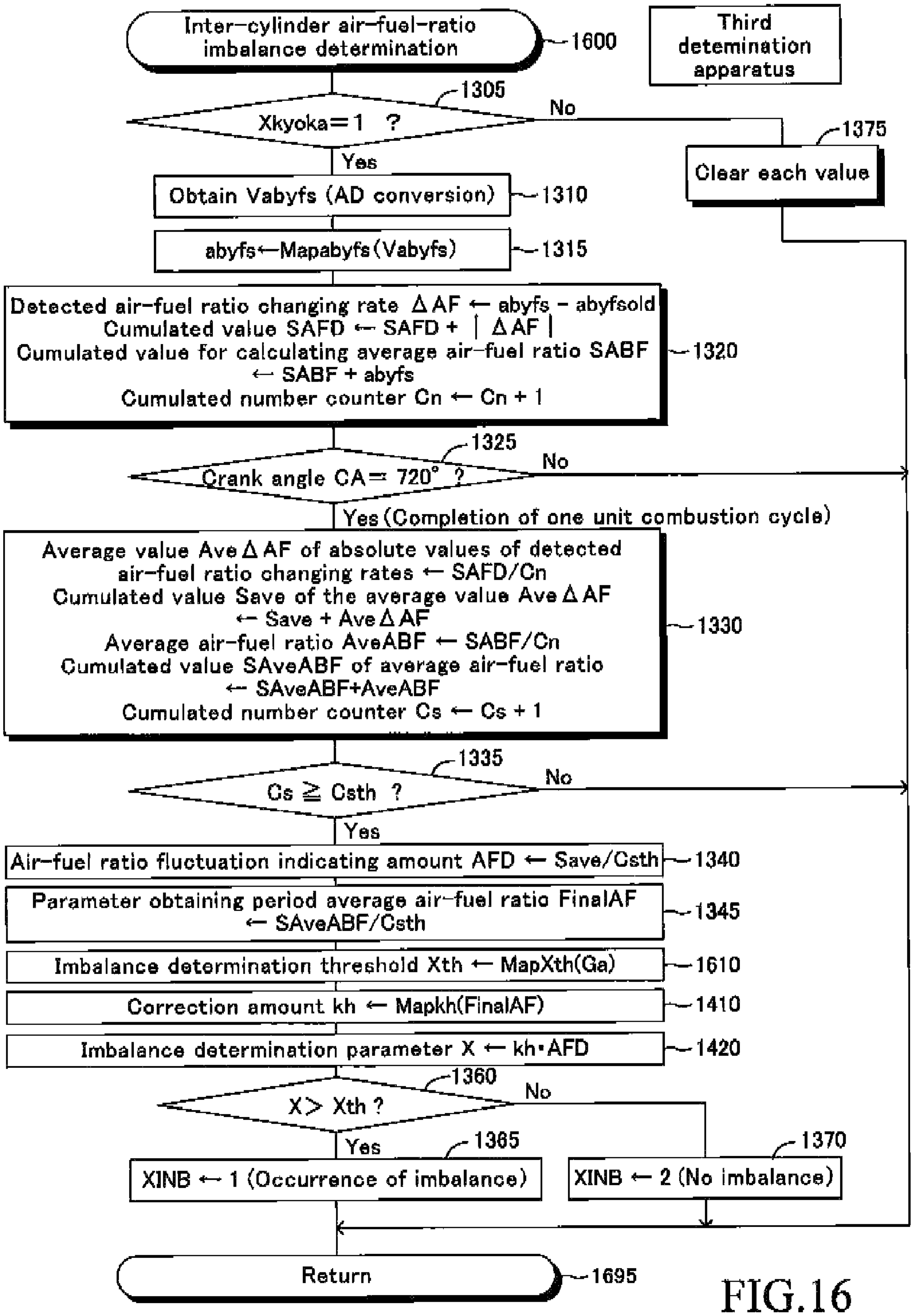
FIG. 16 is a flowchart showing a routine executed by the CPU of an inter-cylinder air-fuel ratio imbalance determination apparatus (third determination apparatus) according to a third embodiment of the present invention.

The CPU 71 of the third determination apparatus differs from the second determination apparatus only in that the CPU 71 executes a "routine for the inter-cylinder air-fuel ratio imbalance determination" shown in FIG. 16 in place of FIG. 14 every elapse of the sampling time is (4 ms). Accordingly, this difference will be mainly described hereinafter.

The routine shown in FIG. 16 is different from the routine shown in FIG. 14 only in that step 1350 in the routine shown in FIG. 14 is replaced with step 1610. Thus, process of step 1610 will be mainly described.

The CPU 71 proceeds to step 1340 after it finishes the process of step 1335, obtains the air-fuel ratio fluctuation indicating amount AFD at step 1340, and proceeds to step 1345 to obtain the parameter obtaining period average air-fuel ratio FinalAF.

Subsequently, the CPU 71 proceeds to step 1610 to determine the imbalance determination threshold Xth by applying the intake air flow rate Ga to an unillustrated table MapXth(G*a*). According to the table MapXth(G*a*), the imbalance determination threshold Xth is made larger as the intake air flow rate Ga becomes larger. The reason why the imbalance determination threshold Xth is determined in this manner is that the responsivity of the output value Vabyfs of the air-fuel ratio sensor 67 becomes lower as the intake air flow rate Ga is smaller, due to the presence of the protective cover (67*b*, 67*c*).

The CPU 71 proceeds to step 1410 to determine a correction value kh by applying the parameter obtaining period average air-fuel ratio FinalAF calculated at step 1345 to the correction calculation table Mapkh(FinalAF).

Subsequently, the CPU 71 proceeds to step 1420 to obtain (determine) the value (kh·AFD) obtained by multiplying the air-fuel ratio fluctuation indicating amount AFD obtained at step 1340 by the correction coefficient kh, as the imbalance determination parameter X. Thereafter, the CPU 71 proceeds to steps from step 1360 to perform the imbalance determination based on the comparison between the imbalance determination parameter X and the imbalance determination threshold Xth, similarly to the first determination apparatus.

As described above, the third determination apparatus includes the imbalance determination parameter obtaining means for correcting the air-fuel ratio fluctuation indicating amount AFD in such a manner that the air-fuel ratio fluctuation indicating amount AFD becomes larger as the parameter obtaining period average air-fuel ratio FinalAF is closer to the stoichiometric air-fuel ratio based on the parameter obtaining period average air-fuel ratio FinalAF, instead of changing the imbalance determination threshold Xth in accordance with the parameter obtaining period average air-fuel ratio FinalAF, and for obtaining the corrected value as the imbalance determination parameter X (step 1410 and step 1420, shown in FIG. 16).

Accordingly, the third determination apparatus can obtain roughly constant imbalance determination parameter X as long as the cylinder-by-cylinder air-fuel ratio difference is constant, regardless of the decreased responsiveness of the air-fuel ratio sensor 67 when the average value of the air-fuel ratio of the exhaust gas is close to the stoichiometric air-fuel ratio. In other words, it is possible to reduce a difference between the imbalance determination parameter X obtained when the parameter obtaining period average air-fuel ratio FinalAF is a value greatly deviating (away) from the stoichiometric air-fuel ratio and the imbalance determination parameter X obtained when the parameter obtaining period average air-fuel ratio FinalAF is very close to the stoichiometric air-fuel ratio. Consequently, it is possible to determine whether or not the inter-cylinder air-fuel ratio imbalance state has been occurring accurately without greatly changing the imbalance determination threshold Xth.

As described above, each of the determination apparatuses can determine whether or not the inter-cylinder air-fuel ratio imbalance state has been occurring accurately regardless of whether or not the air-fuel ratio of the exhaust gas is fluctuating/varying in the stoichiometric air-fuel ratio region.

The present invention is not limited to the above-described embodiments, and may be adopt various modifications within the scope of the present invention. For example, the air-fuel ratio fluctuation indicating amount AFD may be one of parameters described below.

(P1) The air-fuel ratio fluctuation indicating amount AFD may be a value corresponding to the trace/trajectory length of the output value Vabyfs of the air-fuel ratio sensor 67 (base indicating amount) or the trace/trajectory length of the detected air-fuel ratio abyfs (base indicating amount). For example, the trace length of the detected air-fuel ratio abyfs may be obtained by obtaining the output value Vabyfs every elapse of the definite sampling time ts, converting the output value Vabyfs into the detected air-fuel ratio abyfs, and integrating/accumulating an absolute value of a difference between the detected air-fuel ratio abyfs and a detected air-fuel ratio abyfs which was obtained the definite sampling time ts before.

It is preferable that the trace length be obtained every elapse of the unit combustion cycle period. An average of the trace lengths for a plurality of the unit combustion cycle periods (i.e., the value corresponding to the trace length) may also be adopted as the air-fuel ratio fluctuation indicating amount AFD. It should be noted that the trace length of the output value Vabyfs or of the detected air-fuel ratio abyfs has a tendency that they become larger as the engine rotational speed becomes higher. Accordingly, when the imbalance determination parameter based on the trace length is used for the imbalance determination, it is preferable that the imbalance determination threshold Xth be made larger as the engine rotational speed NE becomes higher.

(P2) The air-fuel ratio fluctuation indicating amount AFD may be obtained as a value corresponding to a base indicating amount which is obtained by obtaining a change rate of the change rate of the output value Vabyfs of the air-fuel ratio sensor 67 or of the detected air-fuel ratio abyfs (i.e., a second-order differential value ($d^2$(Vabyfs)/$dt^2$) of each of those values with respect to time). For example, the air-fuel ratio fluctuation indicating amount AFD may be a maximum value of absolute values of the "second-order differential value ($d^2$(Vabyfs)/$dt^2$) of the output value Vabyfs of the air-fuel ratio sensor 67 with respect to time" in the unit combustion cycle period, or a maximum value of absolute values of the "second-order differential value ($d^2$(abyfs)/$dt^2$) of the detected air-fuel ratio abyfs, represented by the output value Vabyfs of the upstream air-fuel ratio sensor 67 with respect to time" in the unit combustion cycle period.

For example, the change rate of the change rate of the detected air-fuel ratio abyfs may be obtained as follows.

The output value Vabyfs is obtained every elapse of the definite sampling time ts.

The output value Vabyfs is converted into the detected air-fuel ratio abyfs.

A difference between the detected air-fuel ratio abyfs and a detected air-fuel ratio abyfs obtained the definite sampling time ts before is obtained as the change rate of the detected air-fuel ratio abyfs.

A difference between the change rate of the detected air-fuel ratio abyfs and a change rate of the detected air-fuel ratio abyfs obtained the definite sampling time ts before is obtained as the change rate of the change rate of the detected air-fuel ratio abyfs (second-order differential value ($d^2$(abyfs)/$dt^2$).

In this case, among a plurality of the change rates of the change rate of the detected air-fuel ratio abyfs, that are obtained during the unit combustion cycle period, a value whose absolute value is the largest may be selected. In addition, such maximum values may be obtained for a plurality of the unit combustion cycle periods. Further, an average of the maximum values may be adopted as the air-fuel ratio fluctuation indicating amount AFD.

In addition, each of the determination apparatuses adopts the differential value d(abyfs)/dt (detected air-fuel ratio changing rate ΔAF) as the base indicating amount, and adopts the value based on the average of the base indicating amounts in the unit combustion cycle period as the air-fuel ratio fluctuation indicating amount AFD.

On the other hand, each of the determination apparatuses may adopt the differential value d(abyfs)/dt (detected air-fuel ratio changing rate ΔAF) as the base indicating amount, obtain a value P1 whose absolute value is the largest among the differential values d(abyfs)/dt, each of which is obtained in the unit combustion cycle period and has a positive value, obtain a value P2 whose absolute value is the largest among the differential values d(abyfs)/dt, each of which is obtained in the unit combustion cycle period and has a negative value, and adopt a larger value among the value P1 and the value P2 as the base indicating amount.

Furthermore, each of the determination apparatuses described above may be applied to a V-type engine. In such a case, the V-type engine may comprise, a right bank upstream catalyst disposed at a position downstream of an exhaust gas merging portion of two or more of cylinders belonging to a right bank (a catalyst disposed in the exhaust passage of the engine and at a position downstream of the exhaust gas merging portion into which the exhaust gases merge, the exhaust gases being discharged from chambers of at least two or more of the cylinders among a plurality of the cylinders), a left bank upstream catalyst disposed at a position downstream of an exhaust gas merging portion of two or more of cylinders belonging to a left bank (a catalyst disposed in the exhaust passage of the engine and at a position downstream of the exhaust merging portion into which the exhaust gases merge, the exhaust gases being discharged from chambers of two or more of the cylinders among the rest of the at least two or more of the cylinders).

Further, the V-type engine may comprise an upstream air-fuel ratio sensor for the right bank and a downstream air-fuel ratio sensor for the right bank disposed upstream and downstream of the right bank upstream catalyst, respectively, and may comprise upstream air-fuel ratio sensor for the left bank and a downstream air-fuel ratio sensor for the left bank disposed upstream and downstream of the left bank upstream catalyst, respectively. Each of the upstream air-fuel ratio sensors, similarly to the air-fuel ratio sensor 67, is disposed between the exhaust gas merging portion of each of the banks and the upstream catalyst of each of the banks. In this case, a main feedback control for the right bank and a sub feedback for the right bank are performed, and a main feedback control for the left bank and a sub feedback for the left bank are independently performed.

In this case, the determination apparatus may obtain "an air-fuel ratio fluctuation indicating amount AFD, an imbalance determination parameter X, and an imbalance determination threshold Xth" for the right bank based on the output value of the upstream air-fuel ratio sensor for the right bank, and may determine whether or not an, inter-cylinder air-fuel ratio imbalance state has been occurring among the cylinders belonging to the right bank using those values.

Similarly, the determination apparatus may obtain "an air-fuel ratio fluctuation indicating amount AFD, an imbalance determination parameter X, and an imbalance determination threshold Xth" for the left bank based on the output value of the upstream air-fuel ratio sensor for the left bank, and may determine whether or not an inter-cylinder air-fuel ratio imbalance state has been occurring among the cylinders belonging to the left bank using those values.

In addition, the third determination apparatus may maintain the imbalance determination threshold Xth at a constant value.

Figure 17:
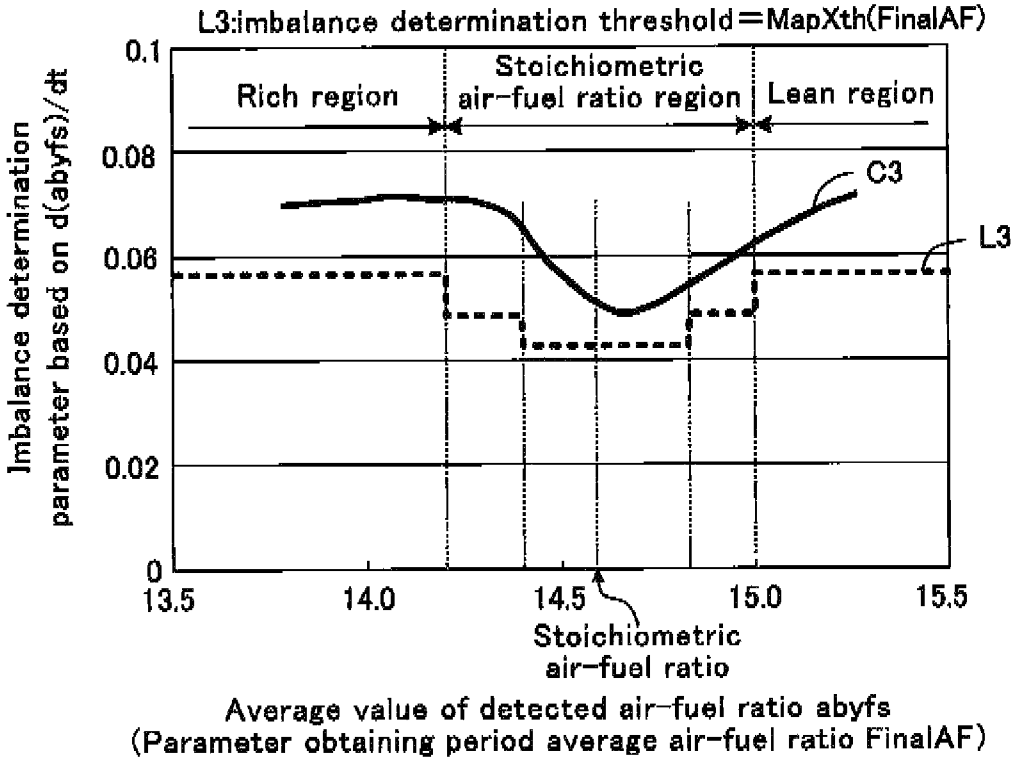
FIG. 17 is a table to which a CPU of a modification of the inter-cylinder' air-fuel ratio imbalance determination apparatuses according to the embodiments of the present invention refers, to determine an imbalance determination threshold.

Furthermore, as shown in FIG. 17, each of the determination apparatuses may decrease the imbalance determination threshold Xth in a stepwise fashion as the parameter obtaining period average air-fuel ratio FinalAF comes closer to the stoichiometric air-fuel ratio. In addition, each of the determination apparatuses may stop performing the inter-cylinder air-fuel ratio imbalance determination based on the imbalance determination parameter, when the parameter obtaining period average air-fuel ratio FinalAF is extremely close to the stoichiometric air-fuel ratio (i.e., when the parameter obtaining period average air-fuel ratio FinalAF is within a narrow air-fuel ratio range in the middle of the stoichiometric air-fuel ratio region, the narrow air-fuel ratio range including the stoichiometric air-fuel ratio).

The invention claimed is:

1. An inter-cylinder air-fuel ratio imbalance determination apparatus for an internal combustion engine, applied to a multi-cylinder internal combustion engine having a plurality of cylinders, comprising:

an air-fuel ratio sensor, which is disposed in an exhaust merging portion of an exhaust passage of said engine into which exhaust gases discharged from at least two or more cylinders among a plurality of said cylinders merge or disposed in said exhaust passage at a position downstream of said exhaust merging portion, and which includes an air-fuel ratio detection section having a solid electrolyte layer, an exhaust-gas-side electrode layer which is formed on one of surfaces of said solid electrolyte layer, a diffusion resistance layer which covers said exhaust-gas-side electrode layer and which said exhaust gases reaches, and an atmosphere-side electrode layer which is formed on the other one of said surfaces of said solid electrolyte layer and is exposed to an atmosphere chamber, wherein, when a predetermined voltage is applied between said exhaust-gas-side electrode layer and said atmosphere-side electrode layer, said air-fuel ratio sensor outputs, based on a limiting current flowing through said solid electrolyte layer, an output value corresponding to an air-fuel ratio of an exhaust gas passing through said position at which the air-fuel ratio sensor is disposed;

a plurality of fuel injection valves, each of which is disposed in such a manner that it corresponds to each of said at least two or more of said cylinders, and each of which injects fuel contained in an air-fuel mixture supplied to each of combustion chambers of said two or more of said cylinders;

air-fuel ratio fluctuation indicating amount obtaining portion which is configured so as to obtain, based on said output value of said air-fuel ratio sensor, an air-fuel ratio fluctuation indicating amount whose absolute value becomes larger as a fluctuation of said air-fuel ratio of said exhaust gas passing through said position at which said air-fuel ratio sensor is disposed becomes larger; and imbalance determining portion which is configured so as to compare an imbalance determination parameter which becomes larger as said absolute value of said obtained air-fuel ratio fluctuation indicating amount becomes larger with a predetermined imbalance determination threshold, and so as to determine that an inter-cylinder air-fuel ratio imbalance state has been occurring when said imbalance determination parameter is larger than said imbalance determination threshold;

wherein, said imbalance determining means portion includes threshold determining portion which is configured so as to obtain, based on said output value of said air-fuel ratio sensor, a parameter obtaining period average air-fuel ratio which is an average value of said air-fuel ratio of said exhaust gas passing through said position at which said air-fuel ratio sensor is disposed during a period in which said air-fuel ratio fluctuation indicating amount is being obtained, and so as to determine, based on said parameter obtaining period average air-fuel ratio, said imbalance determination threshold in such a manner that said imbalance determination threshold becomes smaller as said parameter obtaining period average air-fuel ratio is closer to a stoichiometric air-fuel ratio.

2. The inter-cylinder air-fuel ratio imbalance determination apparatus according to claim 1, wherein said imbalance determining portion includes imbalance determination parameter obtaining portion which is configured so as to obtain, as said imbalance determination parameter, a value obtained by correcting said air-fuel ratio fluctuation indicating amount based on said parameter obtaining period average air-fuel ratio in such a manner that said air-fuel ratio fluctuation indicating amount is made larger as said parameter obtaining period average air-fuel ratio is closer to the stoichiometric air-fuel ratio.

3. The inter-cylinder air-fuel ratio imbalance determination apparatus according to claim 2, wherein, said air-fuel ratio detection section of said air-fuel ratio sensor includes a catalyst section which accelerates an oxidation-reduction reaction and has an oxygen storage function; and said air-fuel ratio sensor is configured so as to lead said exhaust gas flowing through said exhaust passage to said diffusion resistance layer through said catalyst section.

4. The inter-cylinder air-fuel ratio imbalance determination apparatus according to claim 2, wherein, said air-fuel ratio sensor further comprises a protective cover, which accommodates said air-fuel ratio detecting section in its inside so as to cover said air-fuel detecting section, and which includes an inflow hole for allowing said exhaust gas passing through said exhaust gas passage to flow into said inside of said protective cover and an outflow hole for allowing said exhaust gas which has flowed into the inside of said protective cover to flow out to said exhaust gas passage.

5. The inter-cylinder air-fuel ratio imbalance determination apparatus according to claim 4, wherein, said air-fuel ratio fluctuation indicating amount obtaining portion is configured so as to obtain, as a base indicating amount, a differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

6. The inter-cylinder air-fuel ratio imbalance determination apparatus according to claim 4, wherein, said air-fuel ratio fluctuation indicating amount obtaining portion is configured so as to obtain, as a base indicating amount, a second-order differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

7. The inter-cylinder air-fuel ratio imbalance determination apparatus according to claim 1, wherein, said air-fuel ratio detection section of said air-fuel ratio sensor includes a catalyst section which accelerates an oxidation-reduction reaction and has an oxygen storage function; and said air-fuel ratio sensor is configured so as to lead said exhaust gas flowing through said exhaust passage to said diffusion resistance layer through said catalyst section.

8. The inter-cylinder air-fuel ratio imbalance determination apparatus according to claim 7, wherein, said air-fuel ratio sensor further comprises a protective cover, which accommodates said air-fuel ratio detecting section in its inside so as to cover said air-fuel detecting section, and which includes an inflow hole for allowing said exhaust gas passing through said exhaust gas passage to flow into said inside of said protective cover and an outflow hole for allowing said exhaust gas which has flowed into the inside of said protective cover to flow out to said exhaust gas passage.

9. The inter-cylinder air-fuel ratio imbalance determination apparatus according to claim 8, wherein, said air-fuel ratio fluctuation indicating amount obtaining portion is configured so as to obtain, as a base indicating amount, a differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

10. The inter-cylinder air-fuel ratio imbalance determination apparatus according to claim 8, wherein, said air-fuel ratio fluctuation indicating amount obtaining portion is configured so as to obtain, as a base indicating amount, a second-order differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

11. The inter-cylinder air-fuel ratio imbalance determination apparatus according to claim 1, wherein, said air-fuel ratio sensor further comprises a protective cover, which accommodates said air-fuel ratio detecting section in its inside so as to cover said air-fuel detecting section, and which includes an inflow hole for allowing said exhaust gas passing through said exhaust gas passage to flow into said inside of said protective cover and an outflow hole for allowing said exhaust gas which has flowed into the inside of said protective cover to flow out to said exhaust gas passage.

12. The inter-cylinder air-fuel ratio imbalance determination apparatus according to claim 11, wherein, said air-fuel ratio fluctuation indicating amount obtaining means portion is configured so as to obtain, as a base indicating amount, a differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

13. The inter-cylinder air-fuel ratio imbalance determination apparatus according to claim 11, wherein, said air-fuel ratio fluctuation indicating amount obtaining portion is configured so as to obtain, as a base indicating amount, a second-order differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

14. An inter-cylinder air-fuel ratio imbalance determination apparatus for an internal combustion engine, applied to a multi-cylinder internal combustion engine having a plurality of cylinders, comprising:

an air-fuel ratio sensor, which is disposed in an exhaust merging portion of an exhaust passage of said engine into which exhaust gases discharged from at least two or more cylinders among a plurality of said cylinders merge or disposed in said exhaust passage at a position downstream of said exhaust merging portion, and which includes an air-fuel ratio detection section having a solid electrolyte layer, an exhaust-gas-side electrode layer which is formed on one of surfaces of said solid electrolyte layer, a diffusion resistance layer which covers said exhaust-gas-side electrode layer and which said exhaust gases reaches, and an atmosphere-side electrode layer which is formed on the other one of said surfaces of said solid electrolyte layer and is exposed to an atmosphere chamber, wherein, when a predetermined voltage is applied between said exhaust-gas-side electrode layer and said atmosphere-side electrode layer, said air-fuel ratio sensor outputs, based on a limiting current flowing through said solid electrolyte layer, an output value corresponding to an air-fuel ratio of an exhaust gas passing through said position at which the air-fuel ratio sensor is disposed;

a plurality of fuel injection valves, each of which is disposed in such a manner that it corresponds to each of said at least two or more of said cylinders, and each of which injects fuel contained in an air-fuel mixture supplied to each of combustion chambers of said two or more of said cylinders;

air-fuel ratio fluctuation indicating amount obtaining portion which is configured so as to obtain, based on said output value of said air-fuel ratio sensor, an air-fuel ratio fluctuation indicating amount whose absolute value becomes larger as a fluctuation of said air-fuel ratio of said exhaust gas passing through said position at which said air-fuel ratio sensor is disposed becomes larger; and imbalance determining portion which is configured so as to compare an imbalance determination parameter which becomes larger as said absolute value of said obtained air-fuel ratio fluctuation indicating amount becomes larger with a predetermined imbalance determination threshold, and so as to determine that an inter-cylinder air-fuel ratio imbalance state has been occurring when said imbalance determination parameter is larger than said imbalance determination threshold;

wherein, said imbalance determining portion includes imbalance determination parameter obtaining portion which is configured so as to obtain, based on said output value of said air-fuel ratio sensor, a parameter obtaining period average air-fuel ratio which is an average value of said air-fuel ratio of said exhaust gas passing through said position at which said air-fuel ratio sensor is disposed during a period in which said air-fuel ratio fluctuation indicating amount is being obtained, and so as to obtain, as said imbalance determination parameter, a value obtained by correcting said air-fuel ratio fluctuation indicating amount based on said parameter obtaining period average air-fuel ratio in such a manner that said air-fuel ratio fluctuation indicating amount is made larger as said parameter obtaining period average air-fuel ratio is closer to the stoichiometric air-fuel ratio.

15. The inter-cylinder air-fuel ratio imbalance determination apparatus according to claim 14, wherein, said air-fuel ratio detection section of said air-fuel ratio sensor includes a catalyst section which accelerates an oxidation-reduction reaction and has an oxygen storage function; and said air-fuel ratio sensor is configured so as to lead said exhaust gas flowing through said exhaust passage to said diffusion resistance layer through said catalyst section.

16. The inter-cylinder air-fuel ratio imbalance determination apparatus according to claim 14, wherein, said air-fuel ratio sensor further comprises a protective cover, which accommodates said air-fuel ratio detecting section in its inside so as to cover said air-fuel detecting section, and which includes an inflow hole for allowing said exhaust gas passing through said exhaust gas passage to flow into said inside of said protective cover and an outflow hole for allowing said exhaust gas which has flowed into the inside of said protective cover to flow out to said exhaust gas passage.

17. The inter-cylinder air-fuel ratio imbalance determination apparatus according to claim 16, wherein, said air-fuel ratio fluctuation indicating amount obtaining portion is configured so as to obtain, as a base indicating amount, a differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

18. The inter-cylinder air-fuel ratio imbalance determination apparatus according to claim 16, wherein, said air-fuel ratio fluctuation indicating amount obtaining portion is configured so as to obtain, as a base indicating amount, a second-order differential value, with respect to time, of said output value of said air-fuel ratio sensor or of a detected air-fuel ratio which is an air-fuel ratio represented by said output value, and so as to obtain said air-fuel ratio fluctuation indicating amount based on said obtained base indicating amount.

* * * * *